US012776680B2

(12) United States Patent
Kang et al.

(10) Patent No.: US 12,776,680 B2
(45) Date of Patent: Oct. 27, 2026

(54) MOTOR ASSEMBLY CONNECTION RING AND MANUFACTURING METHOD THEREFOR, AND MOTOR ASSEMBLY

(71) Applicant: LG Electronics Inc., Seoul (KR)

(72) Inventors: Joohang Kang, Seoul (KR); Youngchan Ahn, Seoul (KR); Yongdae Kim, Seoul (KR); Jin Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 396 days.

(21) Appl. No.: 18/261,033

(22) PCT Filed: Jan. 11, 2022

(86) PCT No.: PCT/KR2022/000441
§ 371 (c)(1),
(2) Date: Jul. 11, 2023

(87) PCT Pub. No.: WO2022/149947
PCT Pub. Date: Jul. 14, 2022

(65) Prior Publication Data

US 2024/0063678 A1 Feb. 22, 2024

(30) Foreign Application Priority Data

Jan. 11, 2021 (KR) ........................ 10-2021-0003385

(51) Int. Cl.
*H02K 3/52* (2006.01)
*H02K 1/16* (2006.01)
*H02K 15/12* (2025.01)

(52) U.S. Cl.
CPC ............... *H02K 3/522* (2013.01); *H02K 1/16* (2013.01); *H02K 15/12* (2013.01); *H02K 2203/09* (2013.01)

(58) Field of Classification Search
CPC .......... H02K 1/16; H02K 15/12; H02K 15/32; H02K 2203/09; H02K 3/522; H02K 5/1732; H02K 7/14; H02K 9/06
See application file for complete search history.

(56) References Cited

U.S. PATENT DOCUMENTS 4,934,041 A 6/1990 Hoover et al.
12,166,386 B2 * 12/2024 Takada .................. H02K 5/225
(Continued)

FOREIGN PATENT DOCUMENTS

DE 102017207526 A1 * 11/2017 ............ H02K 15/12
EP 3051671 A1 8/2016
(Continued)

OTHER PUBLICATIONS

Extended European Search Report in European Appln. No. 22736924.6, mailed on Jun. 13, 2024, 11 pages.

*Primary Examiner* — Christopher M Koehler
*Assistant Examiner* — Ethan Nguyen Vo
(74) *Attorney, Agent, or Firm* — Fish & Richardson P.C.

(57) ABSTRACT

The present invention relates to a motor assembly connection ring and a manufacturing method therefor, and a motor assembly. A motor assembly of the present invention comprises: a housing; an impeller provided in the housing; a stator provided in the housing and having a plurality of phase coils; a rotor which has a rotation shaft connected to the impeller and is disposed to be rotatable with respect to the stator; and a connection ring formed of an electric conductor and connected to one ends of the plurality of phase coils, wherein the connection ring includes: a ring-shaped body having an open side; and a plurality of phase coil connection units respectively extending in a radial direction from the body and respectively connected to ends of the plurality of phase coils. Accordingly, the production (Continued)

yield (stamping yield) of the connection ring can be increased.

10 Claims, 17 Drawing Sheets

(56) References Cited

U.S. PATENT DOCUMENTS

| | | | | |
|---|---|---|---|---|
| 2019/0001452 | A1 | 1/2019 | Nagahama | |
| 2020/0041224 | A1* | 2/2020 | Makarov | F41A 19/47 |
| 2020/0162007 | A1 | 5/2020 | Sheeks et al. | |
| 2023/0307978 | A1* | 9/2023 | Li | H02K 21/20 |

FOREIGN PATENT DOCUMENTS

| | | | |
|---|---|---|---|
| JP | 2014176213 | | 9/2014 |
| JP | 2015070632 | | 4/2015 |
| JP | 2015080382 | | 4/2015 |
| JP | 2019-170072 | A | 10/2019 |
| KR | 10-2015- 0031634 | | 3/2015 |
| KR | 10-2094085 | B1 | 3/2020 |
| KR | 102171455 | | 10/2020 |

* cited by examiner

MOTOR ASSEMBLY CONNECTION RING AND MANUFACTURING METHOD THEREFOR, AND MOTOR ASSEMBLY

CROSS-REFERENCE TO RELATED APPLICATIONS

This application is a National Stage application under 35 U.S.C. § 371 of International Application No. PCT/KR2022/000441, filed on Jan. 11, 2022, which claims the benefit of Korean Application No. 10-2021-0003385, filed on Jan. 11, 2021. The disclosures of the prior applications are incorporated by reference in their entirety.

TECHNICAL FIELD

The present disclosure relates to a motor assembly connection ring, a manufacturing method thereof, and a motor assembly.

BACKGROUND ART

As is well known, a motor (electric motor) is a device that converts electrical energy into mechanical energy.

Such a motor generally includes a stator and a rotor disposed to be capable of relative movement with respect to the stator.

The rotor is mainly disposed to be rotatable with respect to the stator.

The stator includes a stator core, a stator coil wound around the stator core, and an insulator for insulating the stator core and the stator coil.

Meanwhile, the motor is configured with a motor assembly having an impeller to generate pressure or facilitate the movement of air during operation.

Some of these motor assemblies are applied to so-called handheld devices that are held and used by hand, such as hair dryers or cleaners.

Motor assemblies applied to such handheld devices are particularly required to reduce size and/or weight in consideration of ease of use.

Since the motor assembly of the handheld device is manufactured with a reduced size and/or weight, high-speed operation with a relatively high rotational speed is required to maintain the same pressure or air flow.

Furthermore, the motor assembly of the handheld device requires suppression of vibration increase during high-speed operation and suppression of noise increase due to vibration increase.

However, in such motor assemblies in the related art, there is a problem in that, in general, when an outer size is reduced, a distance between stator teeth is narrowed, causing difficulties in the winding of the stator coil.

In consideration of this, in some cases, a method of separately manufacturing the yoke and teeth of the stator core, winding the stator coil around the teeth, and then combining the teeth with the yoke is used.

However, as described above, in a motor assembly having separate cores in which the yoke and the teeth are separated from each other, there is a problem in that connection between one end (neutral line) and the other end (power line) of each coil portion in the stator coil is not easy.

In particular, there is a problem in that a connection member connecting a neutral line of the stator coil is disposed in a flow path of air moved by the impeller to increase a movement resistance of the air.

In addition, in such a motor assembly in the related art, when the connection member connecting the neutral line of the stator coil is formed using a base material, which is a plate-shaped electrical conductor, there is a problem in that a relatively large amount of the rest (scrap) of the base material forming the connection member is generated.

PRIOR ART DOCUMENT

Patent Document (Patent Document 1) U.S. Pat. No. 4,934,041 B (Jun. 19, 1990)

DISCLOSURE OF INVENTION

Technical Problem

Accordingly, an aspect of the present disclosure is to provide a connection ring for a connection motor assembly, a manufacturing method thereof, and a motor assembly capable of improving yield (stamping yield) during production of the connection ring.

Furthermore, another aspect of the present disclosure is to provide a connection ring for a connection motor assembly, a manufacturing method thereof, and a motor assembly capable of facilitating the connection of the connection ring and suppressing the generation of air resistance caused by the connection ring.

In addition, still another aspect of the present disclosure is to provide a connection ring for a connection motor assembly, a manufacturing method thereof, and a motor assembly capable of stably maintaining an initial installation state of the connection ring.

Solution to Problem

In order to solve the foregoing problems, in a motor assembly according to the present disclosure, a connection ring connecting a phase coil of a stator coil may include a body with an opening at one side thereof and a plurality of phase coil connection portions in a radial direction protruding from the body.

Specifically, when a plate-shaped base material made of electrical conductor is formed using a mold for forming the shape of the connection ring, a phase coil connection portion of another connection ring may be disposed at an inner side of the body of the connection ring through the opening of the body, thereby remarkably increasing a number of the connection rings that can be produced per unit area of the base material.

As a result, yield can be increased during the production of the connection ring.

A motor assembly according to an embodiment of the present disclosure may include a housing; an impeller provided inside the housing; a stator provided inside the housing and provided with a plurality of phase coils; a rotor provided with a rotation shaft connected to the impeller and rotatably disposed with respect to the stator; and a connection ring formed of an electrical conductor, and connected to one ends of the plurality of phase coils, wherein the connection ring includes a ring-shaped body with an opening at one side thereof; ana plurality of phase coil connection portions each extending in a radial direction from the body to be connected to ends of the plurality of phase coils, respectively.

The housing is implemented in a cylindrical shape with openings at both sides thereof.

An impeller is provided at one side within the housing, and a stator and a rotor are disposed to be spaced apart in an axial direction.

The stator is configured to be connected to a three-phase alternating current (AC) power source.

The rotor includes a rotation shaft and a permanent magnet coupled to the rotation shaft.

The rotation shaft of the rotor has a long length and is coupled to the impeller.

In an embodiment of the present disclosure, a bracket coupled to the housing to support the rotation shaft is provided at one side of the housing.

The bracket includes a connection ring accommodation portion allowing the connection ring to be accommodated therein and coupled thereto in an axial direction.

Here, the connection ring may be implemented with copper.

Accordingly, the connection ring may be supported by the bracket, thereby stably maintaining an initial coupling state.

According to an embodiment of the present disclosure, the connection ring may be provided with a protrusion, and the bracket may be provided with a protrusion accommodation portion in which the protrusion is accommodated so as to suppress the protrusion from being separated therefrom.

More specifically, the protrusion and the protrusion accommodation portion may be engaged with each other to suppress the protrusion from being inadvertently separated from the protrusion accommodation portion.

According to an embodiment of the present disclosure, the plurality of phase coil connection portions may each include a radial section connected in a radial direction to the body; and an axial section bent in an axial direction from the radial section.

The protrusions may be respectively disposed to protrude in an axial direction from the radial section.

According to an embodiment of the present disclosure, the protrusion accommodation portion may be disposed to be inclined with respect to an axial direction, and the protrusion may be deformed so as to be disposed to be inclined with respect to the axial direction while being inserted into the protrusion accommodation portion.

Accordingly, when the connection ring is inserted into the connection ring accommodation portion, the protrusion may be plastic-deformed to be inclined with respect to an axial direction so as to apply a resistance thereto when separating the connection ring that is separable along an axial direction from the bracket, thereby suppressing the connection ring from being inadvertently separated from the bracket.

According to an embodiment of the present disclosure, the protrusion may be provided with a slit that is cut to enable elastic deformation, and the protrusion accommodation portion may be provided with an engagement portion having a reduced width compared to a width of the protrusion.

The protrusion may be provided with a slit cut along a protrusion direction from the end thereof, thereby being elastically deformed transversely in an insertion direction of the protrusion.

The protrusion accommodation portion is provided with an engagement portion having a smaller width than that of the protrusion, thereby being elastically deformed to reduce the width of the protrusion when the protrusion is inserted into the protrusion accommodation portion, and allowing the protrusion to be inserted into the protrusion accommodation portion and then being returned to its initial state with its own elastic force.

Here, since an inner width of the protrusion is smaller than an outer width of the protrusion, the protrusion may be engaged with and held in the engagement portion, thereby suppressing the protrusion from inadvertently being separated from the protrusion accommodation portion.

According to an embodiment of the present disclosure, the protrusion may be provided with an elastic deformation portion, and the protrusion accommodation portion may be provided with an engagement portion having a reduced width compared to a width of the elastic deformation portion prior to being elastically deformed.

The protrusion is provided with a protruding portion protruding from the phase coil connection portion, and the elastic deformation portion is bent from an end of the protruding portion and is elastically deformed to approach and separate from the protruding portion.

The protrusions may be disposed at both sides of the phase coil connection portion, respectively.

An outer width of the protrusion before elastic deformation is configured to be larger than an inner width of the engagement portion of the protrusion accommodation portion.

Accordingly, when passing through the engagement portion, the protrusion is elastically deformed such that its outer width is reduced, and returns to its initial state by its own elastic force after passing through the engagement portion.

As a result, the elastic deformation portion of the protrusion may be extended compared to an inner width of the engagement portion, thereby allowing an end of the elastic deformation portion to be engaged with the engagement portion subsequent to coupling so as to suppress the protrusion from being inadvertently separated from the protrusion accommodation portion.

According to an embodiment of the present disclosure, the stator may be provided with a neutral line connection portion into which the axial section is inserted.

Accordingly, the connection ring is coupled to the bracket, and when the bracket is coupled to the housing, the axial section is inserted into the neutral line connection portion, thereby facilitating that coupling.

The neutral line connection portion may be provided with a neutral line connection conductor to which one end of each of the plurality of phase coils and the neutral line connection portion are connected.

Accordingly, since the connection ring and each of one ends (neutral lines) of the plurality of phase coils are electrically connected to each other, thereby allowing the neutral lines of the plurality of phase coils to be easily connected (Y-connection).

According to an embodiment of the present disclosure, the axial section may be provided with an engagement portion with which one region of the neutral line connection conductor is engaged.

Accordingly, the connection ring may be suppressed from being inadvertently separated from the neutral line connection portion.

According to an embodiment of the present disclosure, the stator may include a stator core and a stator coil including the plurality of phase coils wound around the stator core, The stator core may include a ring-shaped yoke; and a plurality of teeth coupled to be disposed in a radial direction on an inner surface of the yoke.

The plurality of teeth may be implemented with three teeth.

Here, the plurality of phase coils may be wound around the plurality of teeth, respectively.

More specifically, the plurality of phase coils are configured to be connected to respective phases (U-phase, V-phase, W-phase) of a three-phase AC power source.

The plurality of phase coils are each wound around the three teeth and implemented with three phase coils.

The plurality of phase coils are implemented with concentrated windings each concentratedly wound on the plurality of teeth.

On the other hand, according to another field of the present disclosure, there is provided a motor assembly connection ring that connects one ends of a plurality of phase coils of a motor assembly, the motor assembly including a housing, an impeller provided inside the housing, a stator provided inside the housing and provided with a plurality of phase coils, and a rotor provided with a rotation shaft connected to the impeller and rotatably disposed with respect to the stator, the connection ring including a ring-shaped body with an opening at one side thereof; and a plurality of phase coil connection portions each extending in a radial direction from the body to be connected to ends of the plurality of phase coils, respectively.

According to an embodiment of the present disclosure, the plurality of phase coil connection portions may include a first-phase coil connection portion extending in a radial direction from one end of the body; a second-phase coil connection portion extending in a radial direction from the other end of the body; and a third-phase coil connection portion extending in a radial direction between the first-phase coil connection portion and the second-phase coil connection portion along a circumferential direction of the body.

According to an embodiment of the present disclosure, the plurality of phase coil connection portions may each include a radial section extending in a radial direction from the body; and an axial section bent in an axial direction from the radial section.

According to an embodiment of the present disclosure, the plurality of phase coil connection portions may each have a protrusion disposed in an axial direction.

According to an embodiment of the present disclosure, the plurality of phase coil connection portions may each be provided with a cutout portion to allow one end of each of the plurality of phase coils to be inserted thereinto.

According to still another field of the present disclosure, there is provided a method of manufacturing a motor assembly connection ring that connects one ends of a plurality of phase coils of a motor assembly, the motor assembly including a housing, an impeller provided inside the housing, a stator provided inside the housing and provided with a plurality of phase coils, and a rotor provided with a rotation shaft connected to the impeller and rotatably disposed with respect to the stator, the method including a base material and mold preparation step of providing a plate-shaped base material formed of an electrical conductor, and preparing a mold for forming a connection ring having a ring-shaped body with an opening at one side thereof and a plurality of phase coil connection portions each extending in a radial direction from the body to be connected to ends of the plurality of phase coils, respectively; and a step of stamping the base material with the mold so as to form the connection ring.

According to an embodiment of the present disclosure, the plurality of phase coil connection portions may include a first-phase coil connection portion extending in a radial direction from one end of the body; a second-phase coil connection portion extending in a radial direction from the other end of the body; and a third-phase coil connection portion extending in a radial direction between the first-phase coil connection portion and the second-phase coil connection portion along a circumferential direction of the body, wherein the base material and mold preparation step includes a mold alignment step of aligning a plurality of molds such that a third-phase coil connection portion of any one connection ring can be disposed at an inner side of a body of another connection ring to be spaced apart from each other with a preset minimum distance.

According to an embodiment of the present disclosure, the mold alignment step of aligning the plurality of molds may include a first mold alignment step of aligning the opening of the body of any one of the connection rings toward a first direction; and a second mold alignment step of aligning the opening of the connection ring toward a second direction opposite to the first direction.

According to an embodiment of the present disclosure, the plurality of phase coil connection portions may each include a radial section extending in a radial direction from the body; and an axial section bent in an axial direction from the radial section, the method further including forming the axial section subsequent to the stamping of the base material with the mold.

According to an embodiment of the present disclosure, the plurality of phase coil connection portions may each include a protrusion disposed in an axial direction, and the forming of the axial section may include bending the protrusion.

Advantageous Effects of Invention

As described above, according to an embodiment of the present disclosure, a connection ring connecting each of one ends (neutral lines) of the plurality of phase coils of a stator coil may include a body with an opening at one side thereof and a plurality of phase coil connection portions protruding radially from the body, thereby allowing a phase coil connection portion of another connection ring to be disposed at an inner side of the body of the connection ring so as to increase a number of connection rings produced per unit area of a plate-shaped base material.

Furthermore, a connection ring accommodation portion allowing the connection ring to be accommodated in and coupled to a bracket coupled to a housing, thereby allowing the connection ring and the stator coil to be naturally coupled to each other when the bracket is connected thereto so as to quickly and easily perform the connection of the connection ring.

In addition, since the connection ring may be supported by the bracket, thereby stably maintaining a connection state and a coupling state of the connection ring.

Moreover, the connection ring may be provided with a protrusion, and the bracket is provided with a protrusion accommodation portion in which the protrusion is accommodated to suppress the protrusion from being separated therefrom, thereby suppressing the connection ring from being inadvertently separated from the bracket.

Besides, when the protrusion is inserted into the protrusion accommodation portion, it may be deformed so as to be disposed to be inclined with respect to an axial direction, thereby suppressing the protrusion from being inadvertently separated from the protrusion accommodation portion.

Furthermore, the protrusion may be provided with a slit, and the protrusion accommodation portion may be provided with an engagement portion having a width reduced compared to a width of the protrusion, thereby allowing the protrusion to be coupled to the protrusion accommodation portion while being elastically deformed, and suppressing the protrusion from being separated from the engagement portion subsequent to coupling.

In addition, the protrusion may be provided with an elastic deformation portion, and the protrusion accommodation portion may be provided with an engagement portion having a reduced width compared to a width of the elastic deformation portion prior to being elastically deformed, thereby suppressing the protrusion from being separated from the protrusion accommodation portion by the engagement portion.

MODE FOR THE INVENTION

Figure 1:
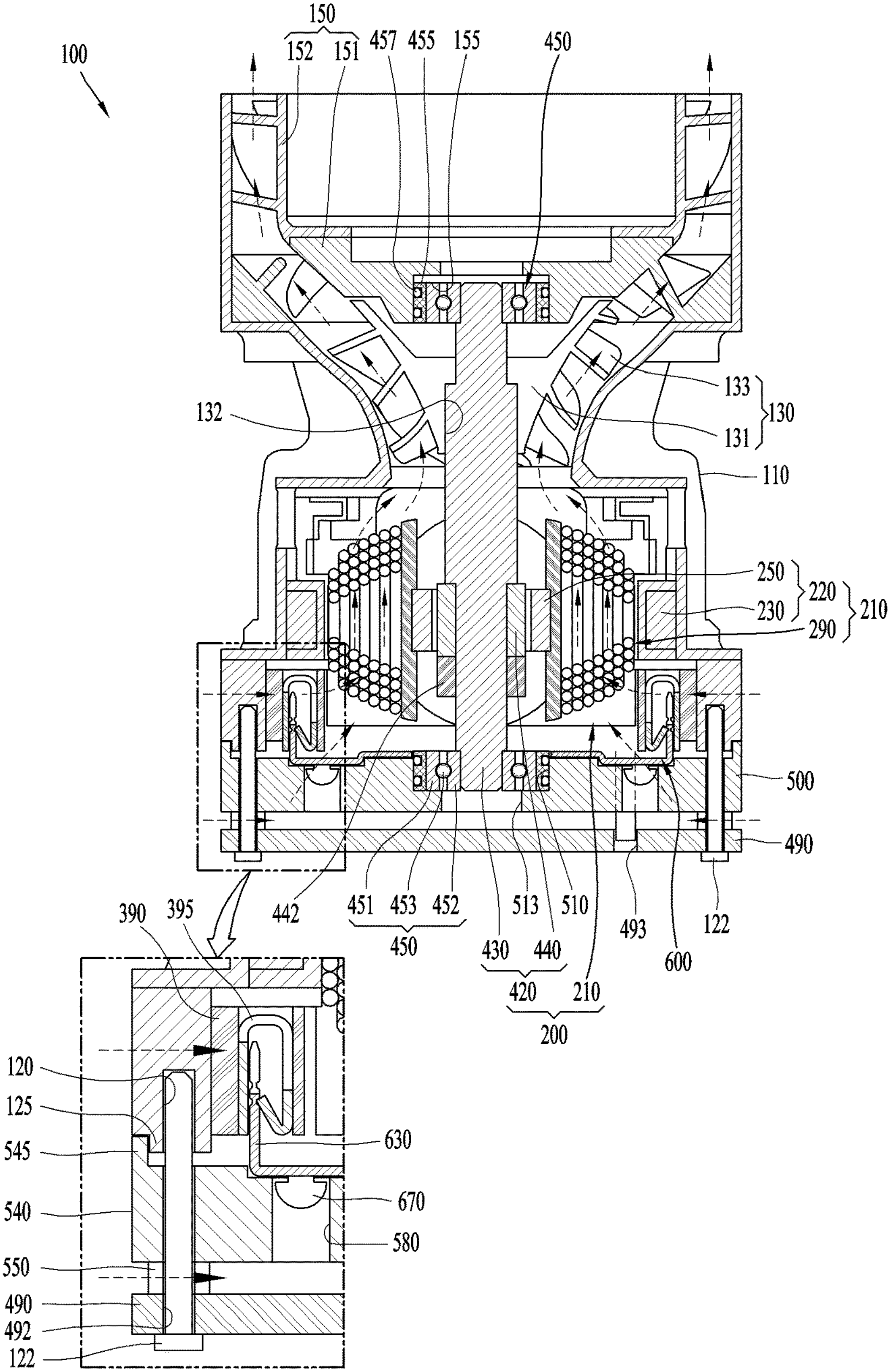
FIG. 1 is a cross-sectional view of a motor assembly according to an embodiment of the present disclosure.

Hereinafter, implementations of the present disclosure will be described in detail with reference to the accompanying drawings. For the sake of brief description with reference to the drawings, the same or equivalent components will be provided with the same reference numerals, and description thereof will not be repeated. A singular representation used herein may include a plural representation unless it represents a definitely different meaning from the context. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings.

Figure 2:
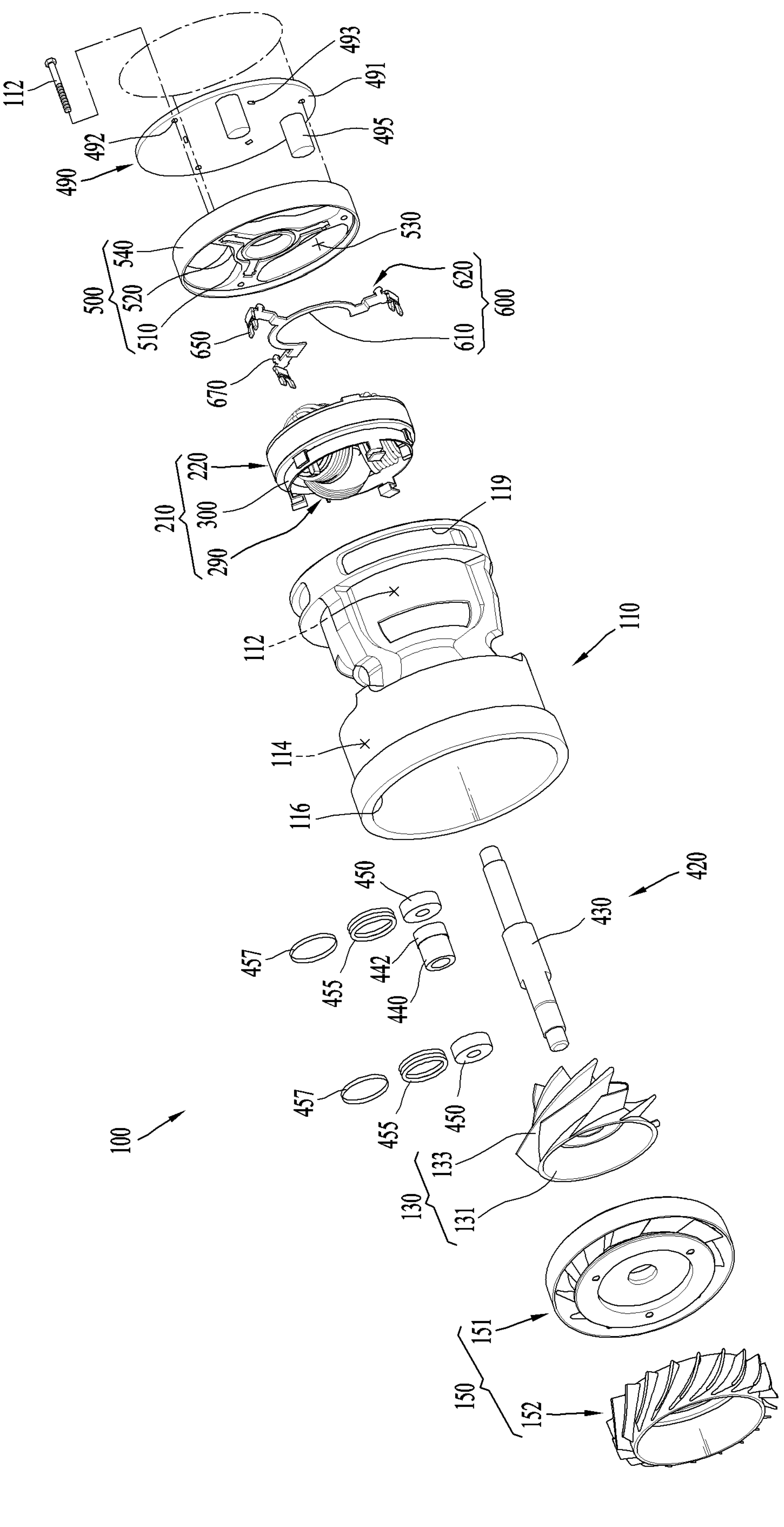
FIG. 2 is an exploded perspective view of the motor assembly of FIG. 1.

FIG. 1 is a cross-sectional view of a motor assembly according to an embodiment of the present disclosure, and FIG. 2 is an exploded perspective view of the motor assembly of FIG. 1. A shown in FIGS. 1 and 2, a motor assembly 100 according to an embodiment of the present disclosure includes a housing 110, an impeller 130, a stator 210, a rotor 420, and a connection ring 600.

The housing 110 includes, for example, an accommodation space in which both sides thereof are open.

The housing 110 may be implemented with a cylindrical body having a circular cross section, for example.

The housing 110 may be implemented such that, for example, an inner diameter of a central region of the accommodation space thereinside is reduced.

An impeller accommodation portion 114 in which the impeller 130 is accommodated is disposed at one side within the housing 110.

A stator accommodation portion 112 in which the stator 210 is accommodated is provided at the other side within the housing 110.

A guide vane accommodation portion 116 is disposed at one side of the impeller accommodation portion 114 within the housing 110.

The housing 110 may include, for example, a through portion 119 through which air can be sucked thereinto.

The through portion 119 may be disposed to communicate with the stator accommodation portion 112, for example.

The impeller 130 includes, for example, a hub 131 and a plurality of blades 133 spaced apart from one another around the hub 131.

The hub 131 may be implemented in a conical shape, for example.

The impeller 130 is, for example, implemented with a so-called mixed-flow impeller that sucks air in an axial direction and discharges the air at an angle to the axial direction.

A rotation shaft hole 132 is disposed to pass through the hub 131 such that a rotation shaft 430 to be described later can be inserted thereinto.

A guide vane 150 for guiding the movement of air is provided at one side of the impeller 130 within the housing 110.

The guide vane 150 may include, for example, a first guide vane 151 and a second guide vane 152 coupled to each other along an axial direction.

In the present embodiment, with respect to the flow of air moving during the rotation of the impeller 130, the stator 210 may be disposed at an upstream side of the impeller 130.

Referring to FIG. 1, it may be configured such that air is sucked in from a lower portion (lower opening) of the housing 110 and discharged to an upper portion (upper opening) of the housing 110. The stator accommodation portion 112 is disposed at an upstream side of the impeller accommodation portion 114 with respect to the flow of air moving during the rotation of the impeller 130.

That is, since the stator 210 is disposed at an upstream side of the impeller 130 with respect to the flow of air during the rotation of the impeller 130, the stator 210 may come into contact with air outside the housing 110 having a relatively low temperature. Accordingly, the cooling of the stator 210 may be further accelerated.

A PCB 490 is provided at one side of the housing 110 (at an upstream side with respect to the flow of air).

The housing 110 is provided on an upper side of the PCB 490.

The PCB 490 includes, for example, a substrate 491 and a plurality of circuit components 495 provided on the substrate 491. For example, a PCB connection terminal coupling portion 493 may be disposed on the substrate 491 to be coupled to a PCB connection terminal 385 to be described later. A fixing member insertion portion 492 may be disposed to pass through the substrate 491 so that the fixing member 122 coupled to the housing 110 can be inserted thereinto, for example.

The stator 210 includes, for example, a stator core 220 and a stator coil 290 wound around the stator core 220. The stator 210 includes an insulator 300 for insulating the stator core 220 and the stator coil 290. The insulator 300 is formed of, for example, an electrical insulation member and is inserted between the stator core 220 and the stator coil 290.

The rotor 420 is rotatably provided inside the stator 210 with a preset air gap (G) therebetween.

The stator 210 and the rotor 420 may be referred to as a drive motor or an impeller drive unit 200 in rotating and driving the impeller 130.

The rotor 420 includes, for example, a rotation shaft 430 and a permanent magnet 440 rotatably coupled to the rotation shaft 430.

An end ring 442 supporting the permanent magnet 440 is provided at one side of the permanent magnet 440.

In the present embodiment, it is illustrated a case where the end ring 442 is provided at one side of the permanent magnet 440, but the end ring 442 may be provided at both sides of the permanent magnet 440.

In the present embodiment, the stator 210 and the rotor 420 are implemented with a very compact motor assembly applicable to handheld devices (e.g., cleaners, hair dryers).

The stator 210 may be implemented with an outer diameter of 35 to 45 mm, for example.

The rotor 420 may be implemented with an outer diameter of 7.5 to 11.5 mm, for example.

In the present embodiment, the stator 210 is implemented with an outer diameter of 39 mm, and the rotor 420 with an outer diameter of 9.5 mm.

In the present embodiment, the stator core 220 includes a yoke 230 and a plurality of teeth 250 disposed in a radial direction on an inner surface of the yoke 230.

In the present embodiment, the plurality of teeth 250 are implemented with three teeth.

The plurality of teeth 250 are, for example, spaced apart at equal angular intervals along a circumferential direction.

Although not specifically shown in the drawings, on an inner surface of the yoke 230, for example, a tooth coupling portion is provided to allow the plurality of teeth 250 to be coupled thereto.

The teeth coupling portion is disposed such that, for example, an end of each of the teeth 250 can be inserted along an axial direction.

The plurality of teeth 250 are spaced apart, for example, at 120-degree intervals.

A slot is disposed between two teeth 250 adjacent to each other.

The stator coil 290 is configured to be connected to, for example, a three-phase AC power source.

The stator coil 290 includes, for example, a plurality of phase coils 291 connected to respective phases (U-phase, V-phase, W-phase) of the three-phase AC power source.

The plurality of phase coils 291 are, for example, implemented with concentrated windings each concentratedly wound around the plurality of teeth 250.

The plurality of phase coils 291 are provided with three phase coils 291.

The three phase coils 291 are configured to be connected to respective phases (U-phase, V-phase, W-phase) of a three-phase AC power source, for example.

Meanwhile, the rotation shaft 430 of the rotor 420 is implemented with a long length so as to be connected to the impeller 130.

Both sides of the rotation shaft 430 are rotatably supported along an axial direction.

Bearings 450 are provided at both ends of the rotation shaft 430, respectively.

Each of the bearings 450 is configured with, for example, ball bearings each including an outer ring 451, an inner ring 452 disposed concentrically with respect to the outer ring 451, and a plurality of balls 453 provided between the outer ring 451 and the inner ring 452.

A bearing holder 455 may be provided at an outer side of each of the bearings 450, for example.

Each of the bearings 450 may be inserted into the bearing holder 455, respectively.

For example, a sealing member 457 may be provided on an outer surface of each of the bearing holders 455, respectively.

The sealing member 457 may be implemented with, for example, an O-ring formed of a rubber material to have a ring shape.

The bearings 450 are provided at both ends (upper and lower ends in the drawing) of the rotation shaft 430, respectively.

A bearing accommodation portion 155 is provided inside the guide vane 150 to accommodate a bearing 450 supporting an upper end of the rotation shaft 430.

The bearing accommodation portion 155 in which the bearing 450 supporting the upper end of the rotation shaft 430 is accommodated is disposed, for example, in the first guide vane 151.

The bearing 450 supporting the lower end of the rotation shaft 430 is provided at one side (a lower side in the drawing) of the housing 110.

A bracket 500 is provided at the lower side of the housing 110 to accommodate and support the bearing 450 supporting the lower end of the rotation shaft 430.

The bracket 500 is, for example, disposed between the housing 110 and the PCB 490 along an axial direction.

The bracket 500 is provided with a bearing accommodation portion 510 to accommodate the bearing 450.

The bracket 500 includes, for example, a bearing accommodation portion 510 and a plurality of spoke portions 520 protruding in a radial direction (radially) around the bearing accommodation portion 510.

The bracket 500 includes, for example, a circular rim portion 540 connecting the plurality of spoke portions 520 to one another.

The bracket 500 is provided with a plurality of boss portions 550 supporting the PCB 490 at a distance therefrom.

The bracket 500 is provided with a fixing member coupling portion 555 such that the fixing member 122 passing through the PCB 490 can be accommodated therein and coupled thereto. The fixing member coupling portion 555 may be disposed to pass through the boss portion 550 in an axial direction, for example.

An insertion portion 125 is disposed in the housing 110 to be inserted into the rim portion 540 of the bracket 500.

The insertion portion 125 is cut out to have an outer diameter reduced compared to an outer diameter of the housing 110.

A housing coupling portion 545 is disposed in the rim portion 540 such that the housing 110 (insertion portion) can be inserted thereinto.

The housing coupling portion 545, for example, may be disposed such that a portion of the rim portion 540 protrudes in an axial direction to have an extended inner diameter surface so as to allow the insertion portion 125 to be inserted thereinto.

Meanwhile, the plurality of phase coils 291 may be connected by the connection ring 600.

More specifically, one ends (power lines 293) of the plurality of phase coils 291 may be connected to the PCB 490.

The other ends (neutral lines 294) of the plurality of phase coils 291 may be electrically connected to one another by the connection ring 600.

The connection ring 600 may be implemented with an electrical conductor.

The connection ring 600 may be disposed between the stator 210 and the bracket 500, for example.

The connection ring 600 may include, for example, a ring-shaped body 610 with an opening at one side thereof and a plurality of phase coil connection portions 620 each extending in a radial direction from the body 610 to be connected to ends of the plurality of phase coils 291, respectively.

The connection ring 600 may be configured to be coupled to the bracket 500 along an axial direction, for example.

Figure 3:
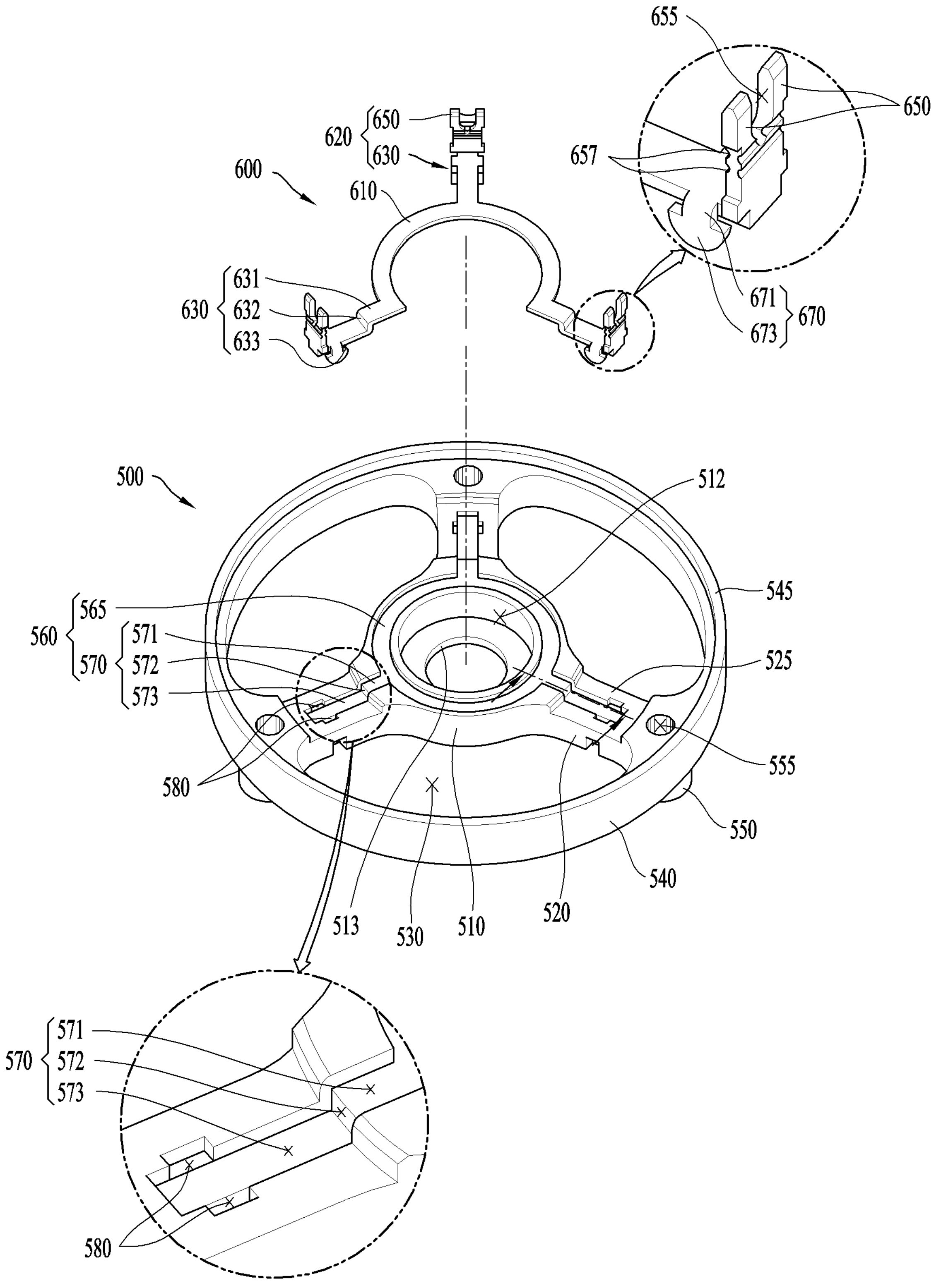
FIG. 3 is a perspective view of a bracket and a connection ring in FIG. 2 prior to coupling.

FIG. 3 is perspective view of a bracket and a connection ring in FIG. 2 prior to coupling. As shown in FIG. 3, the bracket 500 includes a bearing accommodation portion 510, a plurality of spoke portions 520 protruding in a radial direction around the bearing accommodation portion 510, and a circular rim portion 540 connecting the plurality of spoke portions 520 as described above.

The plurality of spoke portions 520 may be configured to respectively correspond to the plurality of phase coils 291, for example.

The plurality of spoke portions 520 are implemented with three spoke portions.

The plurality of spoke portions 520 are spaced apart from one another along a circumferential direction.

A through portion 530 is provided between two spoke portions 520 adjacent to each other.

Each of the through portions 530 is disposed to respectively correspond to the slot of the stator 210.

As a result, air that has passed through the through portion 530 can be easily moved to the slot without greatly increasing flow resistance.

When the impeller 130 is rotationally driven, air introduced from an outside of the housing 110 into an inside of the housing 110 may move through the through portion 530 by way of the slot of the stator 210 and the gap (G).

A plurality of boss portions 550 protruding in an axial direction are implemented on the plurality of spoke portions 520.

The bearing accommodation portion 510 may include, for example, a bearing accommodation space 512 in which a side of the housing 110 or the rotor 420 is open and the other side thereof is closed.

A through hole 513 may be disposed at an opposite side to the opening of the bearing accommodation portion 510 along an axial direction. Accordingly, heat dissipation of the bearing 450 may be accelerated.

The through hole 513 may be configured to have an inner diameter smaller than an outer diameter of the outer ring 451 of the bearing 450, for example.

Accordingly, the bearing 450 may be suppressed from being disengaged in one direction along an axial direction.

Recess portions 525 recessed in an axial direction may be respectively disposed the plurality of spoke portions 520.

The connection ring 600 includes a ring-shaped body 610 with an opening at one side thereof, and a plurality of phase coil connection portions protruding from the body 610 in a radial direction to be connected to the plurality of phase coils 291, respectively.

The body 610 has a circular ring shape.

The body 610 is configured to have a "C" shape, for example, by opening one side of a circular ring.

The plurality of phase coil connection portions 620 are implemented to correspond to a number of the plurality of phase coils 291.

In the present embodiment, the plurality of phase coil connection portions 620 are implemented with three phase coil connection portions.

Meanwhile, the bracket 500 is provided with a connection ring accommodation portion 560 in which the connection ring 600 is accommodated therein and coupled thereto in an axial direction.

Accordingly, the connection ring 600 is first accommodated in and coupled to the bracket 500 and is naturally connected to the stator coil 290 when the bracket 500 and the housing 110 are coupled to each other.

According to this configuration, coupling of the connection ring 600 can be quickly and easily performed.

Furthermore, the connection ring 600 may be accommodated in and coupled to the connection ring accommodation portion 560 of the bracket 500 to be supported thereby so as to stably maintain its initial coupling state.

The plurality of phase coil connection portions 620 each include, for example, a radial section 630 connected in a radial direction to the body 610 and an axial section 650 bent in an axial direction from the radial section 630.

Each of the axial sections 650 may include, for example, a cutout portion 655 cut into which an end (neutral line 294) of each phase coil 291 of the stator coil 290 can be inserted.

Each of the cutout portions 655 may be configured to be cut, for example, from an end of the axial section 650 to a predetermined length along a longitudinal direction of the axial section 650.

Each of the axial sections 650 is provided with, for example, an engagement portion that is in contact with and engaged with a neutral line connection conductor 395 to be described later.

Accordingly, each of the axial sections 650 and the neutral line connection conductor 395 may be suppressed from being inadvertently separated from each other.

Each of the engagement portions may be configured by, for example, cutting a surface of the axial section 650 in a thickness direction.

The axial section 650 is, for example, a first section extending along a radial direction from the body 610, a bending section bent from the first section, and a second section bent from the bending section and disposed in a radial direction.

Here, the bending section is configured to correspond to the recess portions 525 of the plurality of spoke portions 520.

Meanwhile, the connection ring 600 and the connection ring accommodation portion 560 may be coupled to each other so as to suppress separation subsequent to coupling.

To this end, the connection ring 600 may be provided with a protrusion 670, and the bracket 500 may be provided with a protrusion accommodation portion 580 in which the protrusion 670 is accommodated to suppress the protrusion 670 from being separated therefrom.

Figure 4:
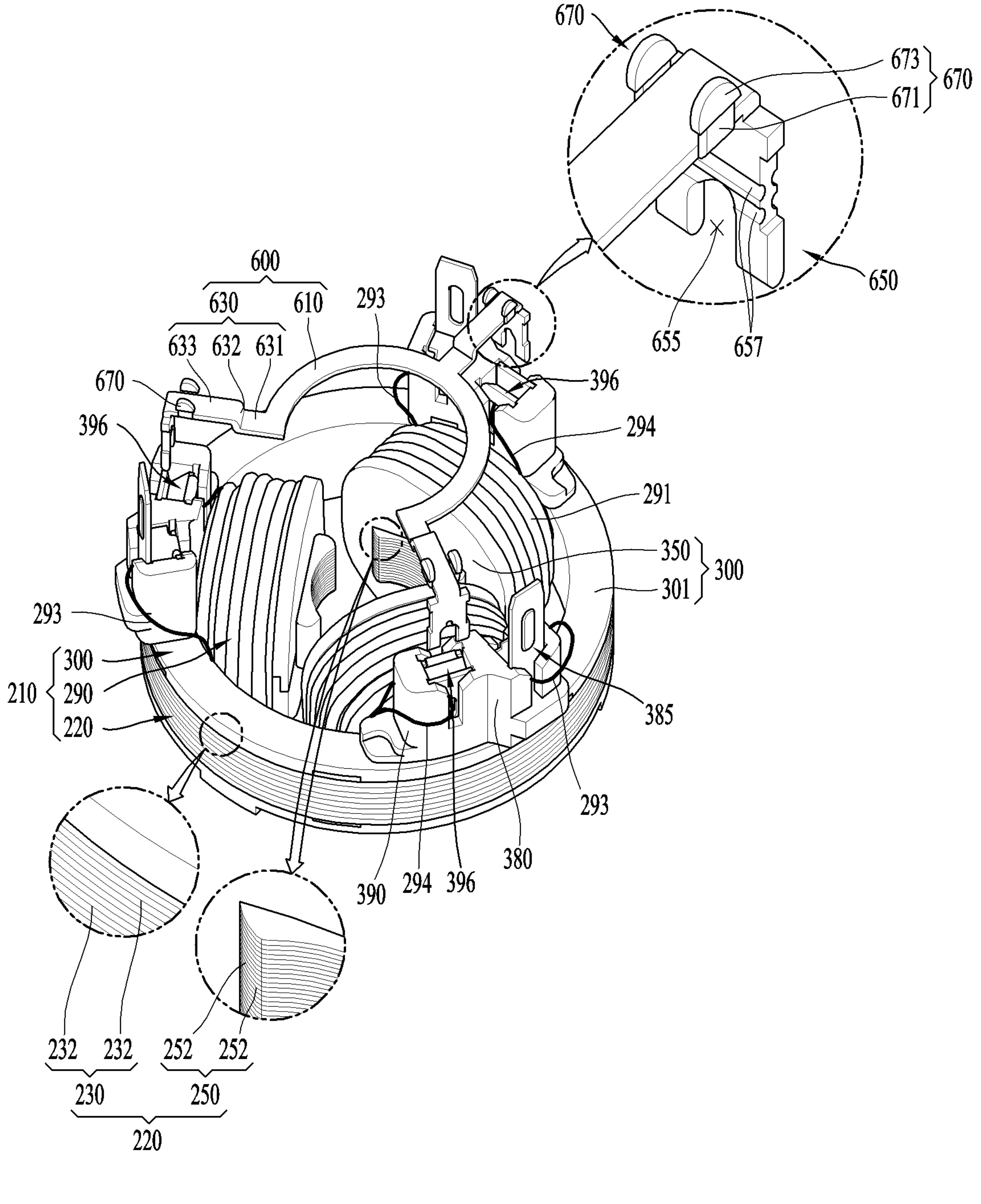
FIG. 4 is a view for explaining coupling between a connection ring and a stator in FIG. 2.
Figure 5:
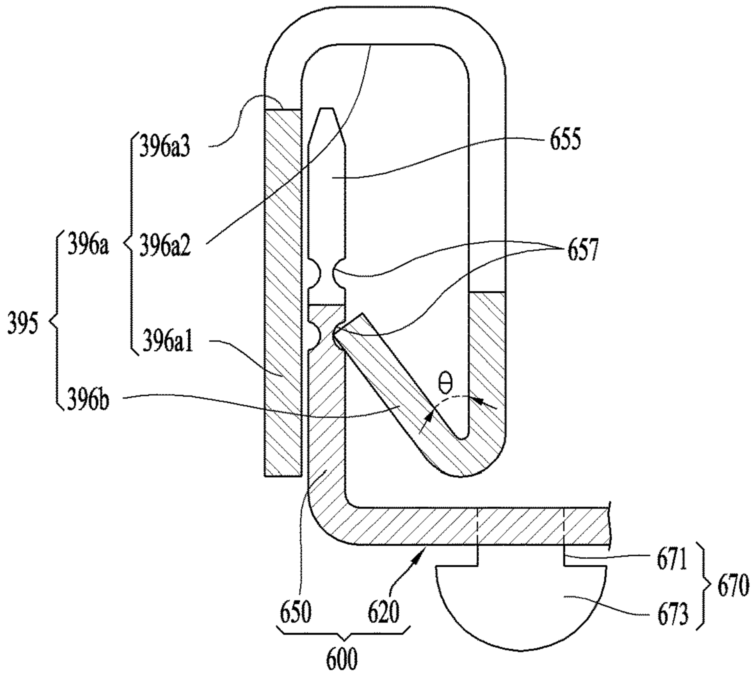
FIG. 5 is a view for explaining coupling between a connection ring and a neutral line connection conductor in FIG. 1.

FIG. 4 is a view for explaining coupling between a connection ring and a stator in FIG. 2, and FIG. 5 is a view for explaining coupling between a connection ring and a neutral line connection conductor in FIG. 1. As shown in FIG. 4, the stator 210 includes a stator core 220, a stator coil 290 wound around the stator core 220, and an insulator 300 for insulating the stator core 220 and the stator coil 290.

The stator core 220 includes, for example, a circular ring-shaped yoke 230 and a plurality of teeth 250 disposed on an inner surface of the yoke 230 to protrude along a radial direction.

A teeth coupling portion is disposed in the yoke 230 such that one end (an outer end in the drawing) of the plurality of teeth 250 can be inserted thereinto and coupled thereto.

The yoke 230 is disposed, for example, by insulating and stacking a plurality of circular ring-shaped electrical steel sheets.

The teeth 250 are disposed, for example, by insulating and stacking a plurality of bar-shaped electrical steel sheets.

The insulator 300 includes, for example, a yoke insulation portion 301 for insulating the yoke 230 and a teeth insulation portion 350 for insulating the teeth 250.

The yoke insulation portion 301 may be configured to insulate upper and lower ends, and an inner surface of the yoke 230 in the drawing, for example.

For example, the teeth insulation portion 350 may be configured to surround a circumferential surface of the teeth 250 (upper and lower ends, and both side portions in the drawing).

The plurality of phase coils 291 of the stator coil 290 are wound around the plurality of teeth 250 (teeth insulation portion 350), respectively.

The plurality of phase coils 291 are respectively wound around the plurality of teeth 250 prior to coupling between the plurality of teeth 250 and the yoke 230.

Here, the plurality of phase coils 291 each have two ends. One end of each of the plurality of phase coils 291 is referred to as a "power line 293" in that it is connected to an electric circuit of the PCB 490 to which three-phase AC power is applied. The other ends of the plurality of phase coils 291 are electrically connected (Y-connection) to one another and are referred to as "neutral lines".

Meanwhile, the insulator 300 includes a power line connection portion 380 to which the power line 293 of the stator coil 290 (a plurality of phase coils 291) is connected.

The insulator 300 includes a neutral line connection portion 390 to which the neutral line 294 of the stator coil 290 (a plurality of phase coils 291) is connected.

The power line connection portion 380 may be provided at one side of the neutral line connection portion 390.

The power line connection portion 380 and the neutral line connection portion 390 are configured to respectively protrude along an axial direction, for example.

Each of the power line connection portions 380 is provided with a PCB connection terminal 385 that protrudes further in an axial direction from the power line connection portion 380 to be connected to the PCB 490.

The PCB connection terminal 385 is formed of an electrical conductor and is configured to be electrically connected to a corresponding power line 293 of the plurality of phase coils 291 inside the PCB connection portion.

A neutral line connection conductor 395 is provided inside the neutral line connection portion 390.

The neutral line connection conductor 395 is formed of an electrical conductor and is electrically connected to each of the neutral lines 294 of the plurality of phase coils 291 and the connection ring 600 inside the neutral line connection portion 390.

As shown in FIG. 5, for example, the neutral line connection conductor 395 includes a body 610 disposed such that the axial section 650 of the connection ring 600 can be inserted thereinto, and a pressing portion disposed to be elastically deformable to elastically press the axial section 650.

The body 610 is implemented with, for example, both side wall portions spaced apart from each other such that the axial section 650 can be inserted thereinto and a connection portion connecting the both side wall portions.

The pressing portion may be disposed to be bent so as to be inclined inwardly from an entrance-side end of either one of the both side wall portions.

Meanwhile, referring to FIG. 4 again, the neutral line connection portion 390 is disposed such that a side of the stator 210 is open along an axial direction.

In the neutral line connection conductor 395, for example, the elastic pressing portion is inserted in a corresponding manner into an opening side of the neutral line connection portion 390.

The connection ring 600 is disposed such that each of the axial sections 650 faces the opening of the neutral line connection portion 390.

The protrusions 670 inserted into and coupled to the bracket 500 are respectively provided in the radial sections 630 of the connection ring 600.

The protrusions 670 protrude from both sides of each of the radial sections 630, respectively, along an axial direction.

The protrusions 670 may respectively protrude from each of the radial sections 630 in a direction opposite to that of the axial section 650.

Each of the protrusions 670 includes, for example, a protruding section 671 protruding from the radial section 630 and an insertion section 673 connected to the protruding section 671 and inserted into the neutral line connection portion 390.

The insertion section 673 may be disposed to have an extended width compared to the protruding section 671, for example.

The insertion section 673 may be implemented in a semicircular shape, for example.

The axial section 650 is provided with an engagement portion that is in contact with an end of the pressing portion of the neutral line connection conductor 395 to be engaged therewith in a separation direction.

The engagement portion may be disposed to be recessed in a thickness direction of the axial section 650 and extend in a width direction, for example.

Figure 6:
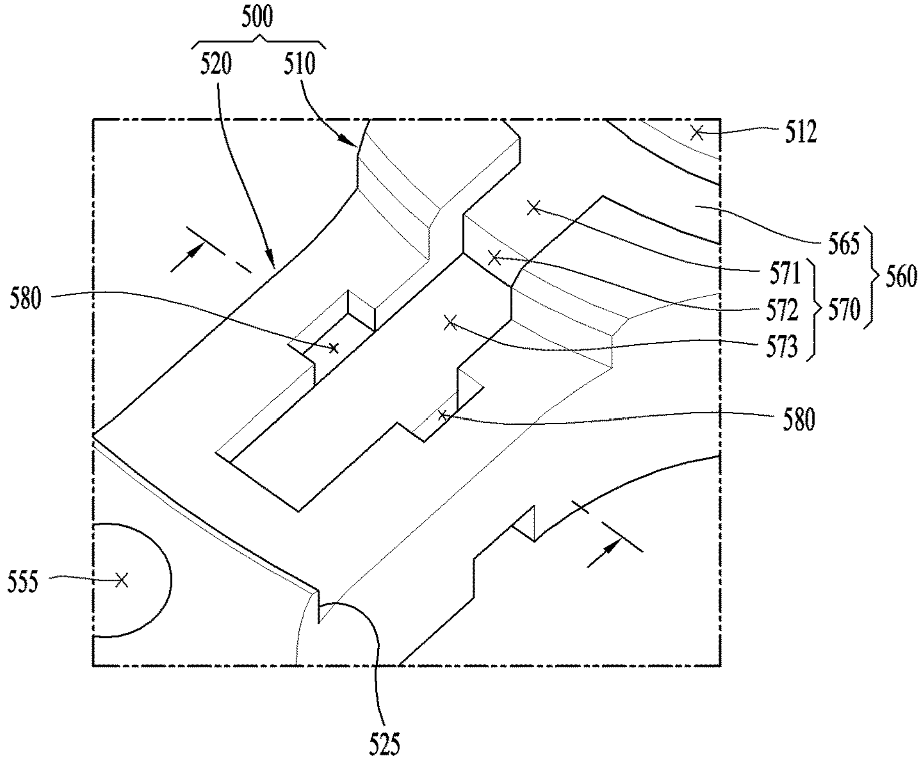
FIG. 6 is an enlarged view of a main portion of the bracket of FIG. 2.

FIG. 6 is an enlarged view of a main portion of the bracket of FIG. 2. As shown in FIG. 6, the bracket 500 includes a connection ring accommodation portion 560 in which the connection ring 600 is accommodated therein and coupled thereto along an axial direction.

The connection ring accommodation portion 560 includes, for example, a body accommodation portion 565 accommodating the body 610 of the connection ring 600 and a phase coil connection portion accommodation portion 570 accommodating the phase coil connection portion 620 (actually the radial section 630) of the connection ring 600.

Referring to FIGS. 3 and 6 together, the body accommodation portion 565 is disposed in a circular ring shape around the bearing accommodation portion 510.

The body accommodation portion 565 is recessed at a predetermined depth along an axial direction from one end (an upper end in the drawing) of the bearing accommodation portion 510.

Each of the phase coil connection portion accommodation portions 570 is disposed to be recessed in each of the spoke portions 520 along an axial direction.

Each of the phase coil connection portion accommodation portions 570 is respectively disposed to communicate with the body accommodation portion 565. The plurality of phase coil connection portion accommodation portions 570 include, for example, a first section 571, a bending section 572, and a second section 573 corresponding to the shape of the phase coil connection portion 620.

Meanwhile, the phase coil connection portion accommodation portion 570 of each of the spoke portions 520 is provided with a protrusion accommodation portion 580 so that the protrusion 670 of the connection ring 600 can be accommodated therein.

Each of the protrusion accommodation portions 580 may be provided with an entrance so as to respectively communicate with the phase coil connection portion accommodation portion 570, for example.

Figure 7:
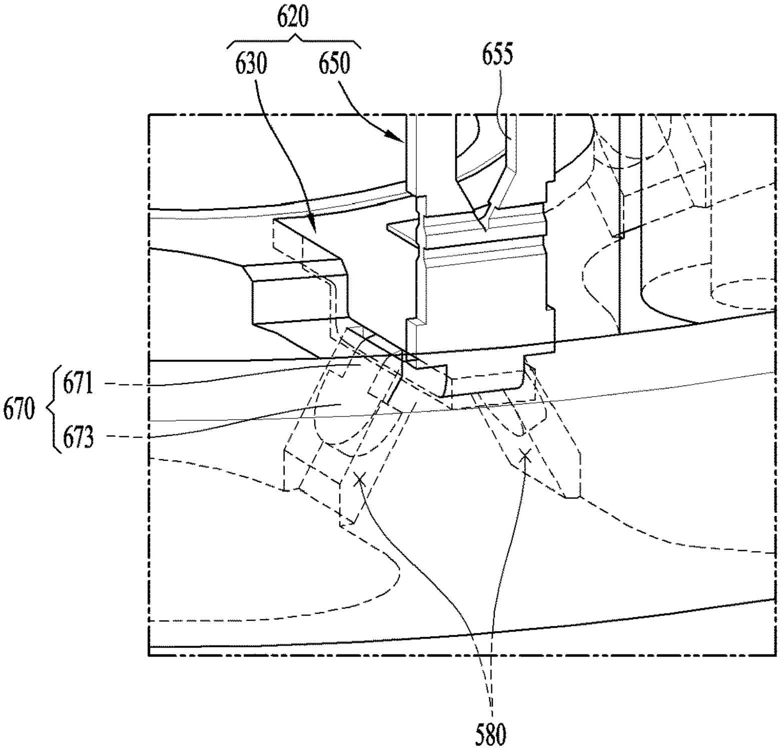
FIG. 7 is a perspective view of a coupling state between a protrusion and a protrusion accommodation portion in FIG. 4.
Figure 8:
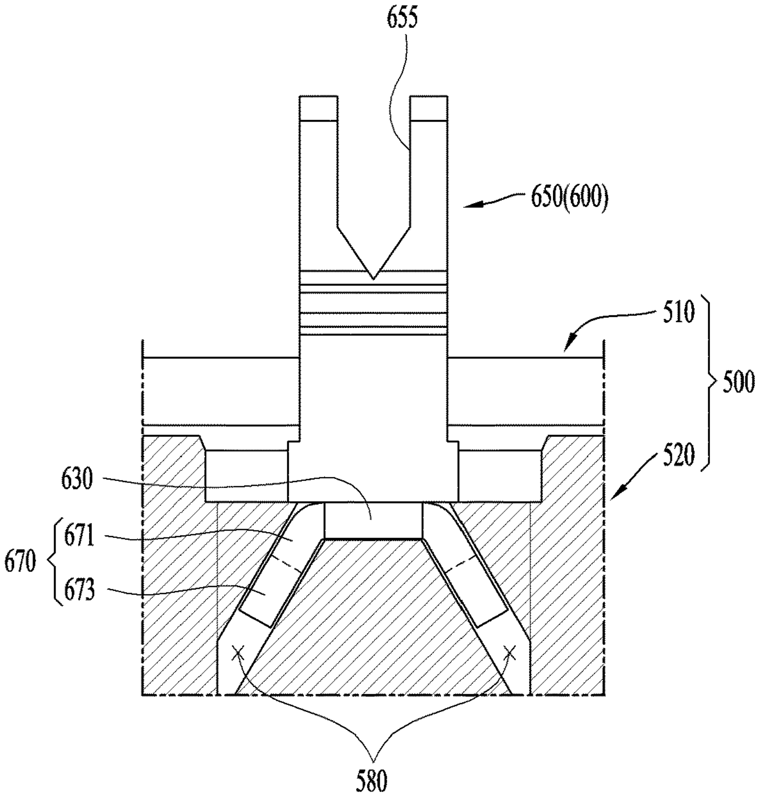
FIG. 8 is a cross-sectional view of a coupling state between the protrusion and the protrusion accommodation portion of FIG. 7.

FIG. 7 is a perspective view of a coupling state between a protrusion and a protrusion accommodation portion in FIG. 4, and FIG. 8 is a cross-sectional view of a coupling state between the protrusion and the protrusion accommodation portion of FIG. 7. As shown in FIG. 7, each of the protrusion accommodation portions 580 may be disposed to be inclined with respect to, for example, an axial direction (a top-down direction in FIG. 7).

Each of the protrusion accommodation portions 580 may be disposed to be inclined in a direction away from each other from the radial section 630, for example.

Each of the protrusion accommodation portions 580 may be configured to widen outwardly as it goes downward from an upper end of the bracket 500 where the entrance is disposed, for example.

As shown in FIG. 8, for example, the protrusion 670 of the connection ring 600 may be disposed along an axial direction prior to being inserted into the protrusion accommodation portion 580, and deformed to be inclined with respect to an axial direction along an inner surface of the protrusion accommodation portion 580 subsequent to being inserted into the protrusion accommodation portion 580.

The protrusion 670 may be disposed to be inclined with respect to an axial direction that is a separation direction of the connection ring 600 subsequent to being coupled to an inside of the protrusion accommodation portion 580.

Accordingly, the protrusion 670 and the protrusion accommodation portion 580 may be disposed to be inclined with respect to the separation direction of the connection ring 600 so as to apply a resistance when separating the connection ring 600, thereby suppressing the connection ring 600 from being inadvertently separated from the connection ring accommodation portion 560.

Figure 9:
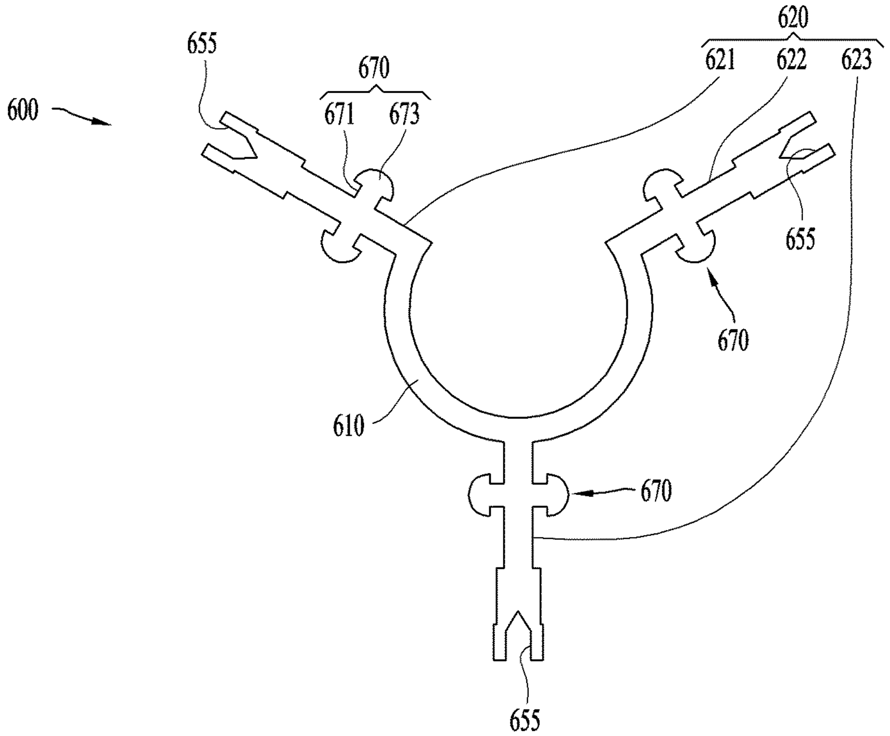
FIG. 9 is an exploded view of the connection ring of FIG. 2.
Figure 10:
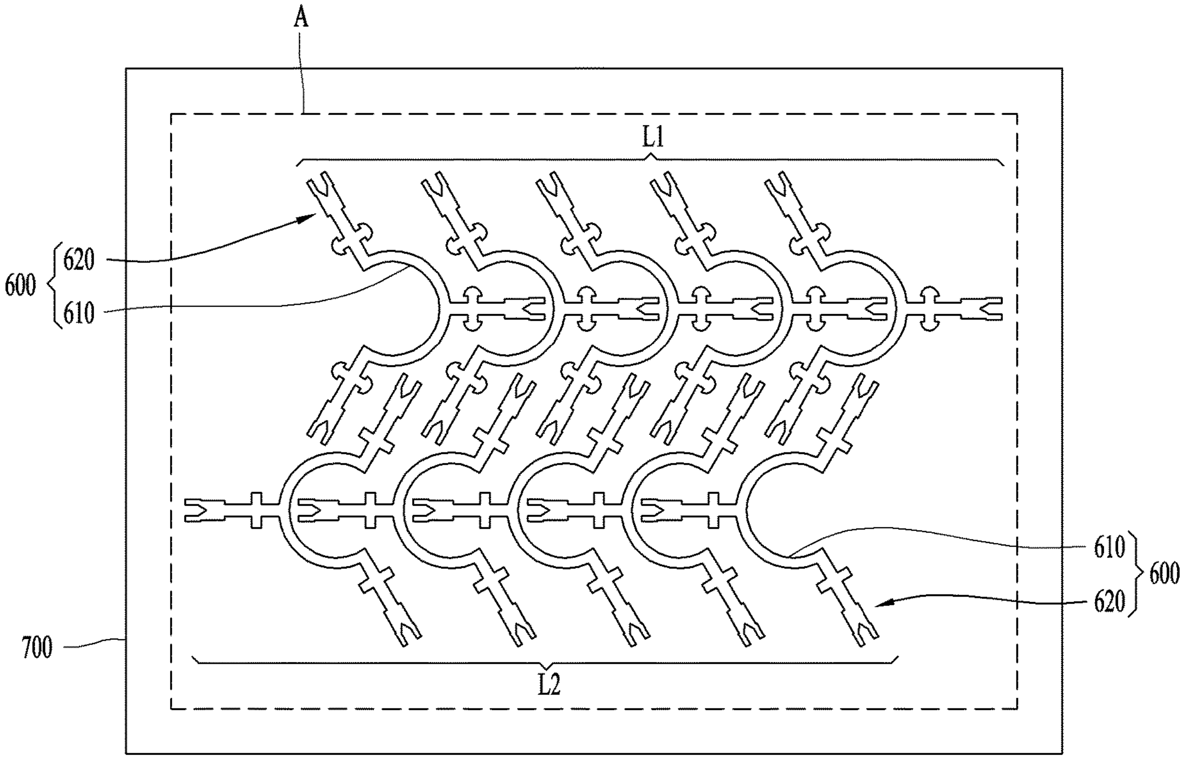
FIG. 10 is a view for explaining a method of manufacturing the connection ring of FIG. 9.
Figure 11:
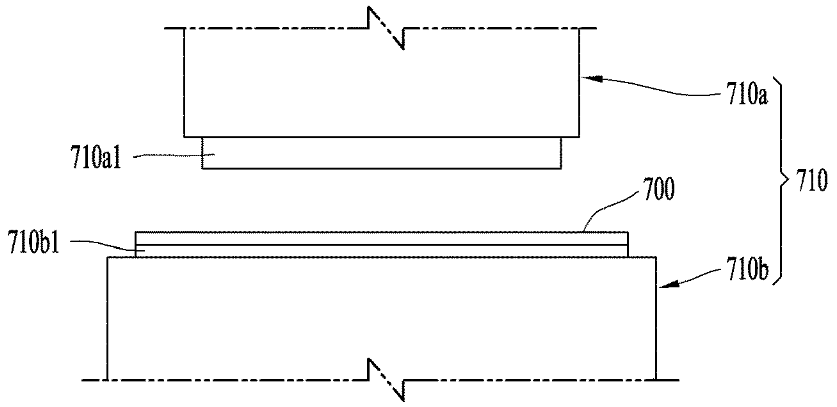
FIG. 11 is a view for explaining a mold and a base material of the connection ring of FIG. 9.

FIG. 9 is an exploded view of the connection ring of FIG. 2, FIG. 10 is a view for explaining a method of manufacturing the connection ring of FIG. 9, and FIG. 11 is a view for explaining a mold and a base material of the connection ring of FIG. 9. The connection ring 600 of the motor assembly 100 of the present embodiment includes a ring-shaped body 610 with an opening at one side thereof and a plurality of phase coil connection portions 620 protruding from the body 610 along a radial direction.

The connection ring 600 is composed of an electrical conductor.

The connection ring 600 may be manufactured using, for example, a copper plate that is an electrical conductor.

As shown in FIG. 9, the body 610 of the connection ring 600 has a circular ring shape with an opening at one side thereof along a circumferential direction. The body 610 is configured such that, for example, an inner angle between both ends is 240 degrees. The opening of the body 610 is configured such that, for example, an inner angle is 120 degrees.

The plurality of phase coil connection portions 620 include, for example, a first-phase coil connection portion 621 extending in a radial direction from one end of the body 610, a second-phase coil connection portion 622 extending in a radial direction from the other end of the body 610, and a third-phase coil connection portion 623 extending in a radial direction between the first-phase coil connection portion 621 and the second-phase coil connection portion 622 along a circumferential direction of the body 610.

Here, since the plurality of teeth 250 are spaced apart at an interval of 120 degrees, an angle between each of the first-phase coil connection portion 621, the second-phase coil connection portion 622, and the third-phase coil connection portion 623 is configured to form an interval of 120 degrees.

The protrusion 670 is provided on each of the plurality of phase coil connection portions 620.

The protrusion 670 may be simultaneously formed in an expanded shape during the formation of the body 610 and the phase coil connection portion 620.

The cutout portions 655 may be disposed at ends of the plurality of phase coil connection portions 620 (axial section 650), respectively.

A plurality of engagement portions 657 may be respectively disposed in the plurality of phase coil connection portions 620 (axial sections 650).

The connection ring 600 may be formed by stamping a base material 700 using a mold 710 with a copper plate, which is an electrical conductor, as the base material 700. Here, the mold 710 may include, for example, a lower mold 710*b* and an upper mold 710*a* provided to be movable up and down on an upper side of the lower mold 710*b*.

As shown in FIG. 10, the connection ring 600 of the motor assembly 100 in the present embodiment may be manufactured such that an opening of the connection ring 600 faces a first direction (left direction in the drawing) of the base material 700, and a phase coil connection portion 620 (third-phase coil connection portion 623) of another connection ring 600 is disposed at an inner side of an opening of the body with a preset minimum distance through the opening of the body 610.

According to this configuration, the phase coil connection portion 620 of another connection ring 600 may be disposed using an inner region of the body 610, thereby significantly increasing a number of connection rings 600 produced per unit area (A) of the base material 700.

Here, a minimum distance between the body 610 of the connection ring 600 and the phase coil connection portion 620 of another connection ring 600 may be configured to be 2.0 mm, for example.

The base material 700 may be configured to have a first row L1 in which the opening of the body 610 of the connection ring 600 is disposed toward a first direction (left side in the drawing) and a second row L2 in which the opening of the body 610 of the connection ring 600 is disposed toward a second direction (right side in the drawing) opposite to the first direction.

The first row L1 and the second row L2 may be spaced apart from each other with the minimum distance (e.g., 2.0 mm).

As a result, the number of the connection rings 600 produced per unit area (A) of the base material 700 may be significantly increased to improve the production yield of the connection rings 600.

FIG. 11 is a view for explaining a mold and a base material of the connection ring of FIG. 9. As shown in FIG. 11, the connection ring 600 of the motor assembly 100 in the present embodiment may be manufactured by placing a base material 700 larger than a size of the unit area (A) at an upper side of the lower mold 710*b*, and simultaneously stamping a plurality of connection rings 600 using the upper mold 710*a* that is movable up and down on the upper side of the lower mold 710*b*. Here, the stamping refers to an operation in which the plurality of connection rings 600 are formed at the same time by allowing the upper mold 710*a* to press the base material 700 supported by the lower mold 710*b* and cutting the base material 700 with an interaction between the upper mold 710*a* and the lower mold 710*b*.

The upper mold 710*a* may include, for example, an upper support portion 710*a*1 having a protruding shape (embossing) corresponding to an inner portion of an edge of the expanded shape of the connection ring 600 shown in FIGS. 9 and 10.

The lower mold 710*b* may include, for example, a lower support portion having a shape (relief or through portion) corresponding to an outer portion of the edge of the expanded shape of the connection ring 600 shown in FIGS. 9 and 10.

With this configuration, when the upper mold 710*a* descends from a state of being in contact with the base material 700 supported by the lower mold 710*b* to a state of pressing the base material 700, the base material 700 is cut by the upper mold 700*a* and the lower mold 700*b* to correspond to the expanded shape of the connection ring 600 so as to simultaneously form the plurality of connection rings 600. The rest (scrap) of the base material 700 remaining after forming the plurality of connection rings 600 are collected separately.

In the present embodiment, the plurality of connection rings 600 may be aligned (a first row L1, a second row L2) to overlap with one another using respective openings thereof, thereby significantly reducing the generation of the scrap of the base material 700.

Figure 12:
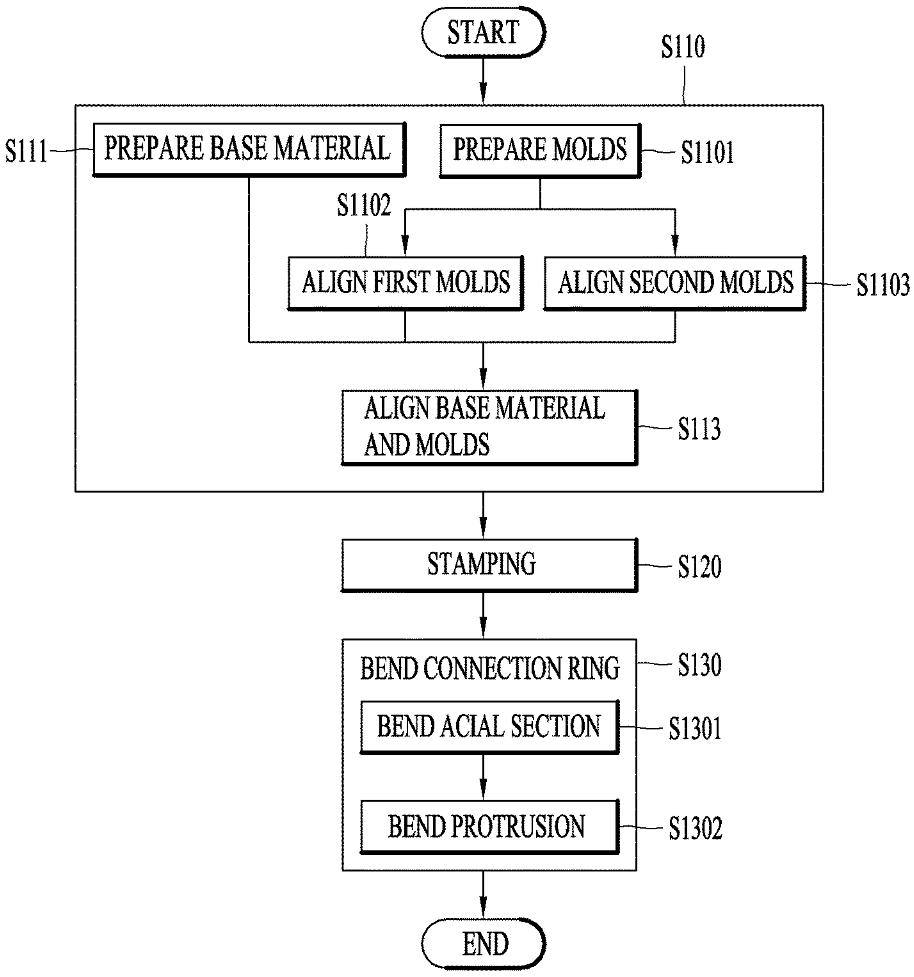
FIG. 12 is a view for explaining a method of manufacturing a motor assembly connection ring according to an embodiment of the present disclosure.

FIG. 12 is drawing, for explaining a method of manufacturing a motor assembly connection ring according to an embodiment of the present disclosure. As shown in FIG. 12, a method of manufacturing a motor assembly connection ring of the present embodiment includes a base material 700 and mold preparation step (S110) of providing a plate-shaped base material 700 formed of an electrical conductor, and preparing a mold for forming a connection ring 600 having a ring-shaped body 610 with an opening at one side thereof and a plurality of phase coil connection portions 620 each extending in a radial direction from the body 610 to be connected to ends of the plurality of phase coils 291, respectively; and stamping the base material 700 with the mold so as to form the connection ring 600 (S120).

Said preparing the base material 700 and the mold (S110) includes a base material 700 preparation step (S111) of preparing the base material 700 having a size larger than a unit area (A) so as to form a plurality of connection rings 600 at the same time. Here, the base material 700 may be configured with a size, for example, including a size of the unit area (A) for forming the plurality of connection rings 600 and a size for fixing the base material 700 to the lower mold 710*b*.

Said preparing the base material 700 and the mold 710 (S110) includes a mold preparation step (S1101) of preparing a plurality of molds 710 so as to form a plurality of connection rings 600 at the same time.

As described above, the mold 710 includes a mold (e.g., upper mold 710*a*) having a shape corresponding to an inner side of an edge of the expanded shape of the connection ring 600 and a mold (e.g., lower mold 710*b*) having a shape corresponding to an outer side of the edge of the expanded shape of the connection ring 600.

The base material 700 and mold 710 preparation step may include, for example, a mold alignment step of aligning a plurality of molds 710 such that the third-phase coil connection portion 623 of any one connection ring 600 can be disposed at an inner side of the body 610 of another connection ring 600 to be spaced apart from each other with a preset minimum distance.

More specifically, the mold alignment step of aligning the plurality of molds 710 may include a first mold alignment step (S1102) of aligning the opening of the body 610 of any one of the connection rings 600 toward a first direction (left side in the drawing); and a second mold alignment step (S1103) of aligning the opening of the connection ring 600 toward a second direction (right side in the drawing) opposite to the first direction.

Here, the plurality of upper molds 710*a* and the plurality of lower molds 710*b* are aligned to form a plurality of connection rings 600 as described above with reference to FIG. 10.

The plurality of upper molds 710*a* may be configured, for example, such that a plurality of upper molds 710*a* aligned through the first mold alignment step (S1102) and a plurality of upper molds aligned through the second mold alignment step (S1103) are simultaneously driven by the same drive unit (not shown).

In addition, the plurality of upper molds 710*a* may be configured, for example, such that a plurality of upper molds 710*a* aligned through the first mold alignment step (S1102) and a plurality of upper molds aligned through the second mold alignment step (S1103) are simultaneously driven or individually driven by different drive units.

Subsequent to the base material 700 and mold 710 preparation step (S110), the base material 700 may include a base material 700 and mold 710 alignment step (S113) aligned between the lower mold 710*b* and the upper mold 710*a*.

In the base material 700 and mold 710 alignment step (S113), the base material 700 may be fixed and supported at a preset position on an upper surface of the lower mold 710*b*.

Subsequent to the base material 700 and mold 710 alignment step (S113), there is provided a stamping step (S120) of descending the upper mold 710*a* to press the base material 700 to form a plurality of connection rings 600.

Subsequent to the stamping step (S120), there is provided a connection ring 600 bending step (S130) of bending the plurality of connection rings 600.

The connection ring 600 bending step (S130) includes, for example, bending each of the plurality of phase coil connection portions 620 of the connection ring 600 to form an axial section 650 (S1301).

Subsequent to forming the axial section 650 (S1301), there is provided a protrusion formation step (S1302) of bending each of the protrusions 670 in a direction opposite to that of the axial section 650.

Meanwhile, in the protrusion formation step (S1302), when the protrusion 670 is bent in a direction opposite to that of the axial section 650 and the formation of the plurality of connection rings 600 is completed, the connection ring 600 may be coupled to the bracket 500.

When desired to couple the connection ring 600 to the bracket 500, the connection ring 600 is disposed at a side of the connection ring accommodation portion 560 of the bracket 500 along an axial direction. At this time, the connection ring 600 is disposed such that the protrusion 670 faces the protrusion accommodation portion 580.

Next, each protrusion 670 of the connection ring 600 is disposed to correspond to the entrance of the corresponding protrusion accommodation portion 580, and the connection ring 600 and the bracket 500 are pressed to approach each other.

Here, since each protrusion 670 of the connection ring 600 is disposed along an axial direction, and the protrusion accommodation portion 580 is disposed to be inclined with respect to the axial direction, a pressing force sufficient to cause deformation (plastic deformation) of the protrusion 670 is required to insert the protrusion 670 into the protrusion accommodation portion 580.

When the connection ring 600 and the bracket 500 are pressed such that the protrusion 670 can be inserted into the protrusion accommodation portion 580 with a pressing force of a predetermined size, the protrusion 670 is inserted into the protrusion 670 while being deformed along an inner surface of the protrusion accommodation portion 580.

As the protrusion 670 is inserted thereinto, the body 610 and the radial section 630 may be inserted into the body accommodation portion 565 and the phase coil connection portion accommodation portion 570, respectively.

When the insertion of the connection ring 600 is completed, the protrusion 670 is deformed (plastically deformed) along an inside of the protrusion accommodation portion 580 and disposed to be inclined with respect to an axial direction.

The protrusion 670 and the protrusion accommodation portion 580 are disposed to be inclined with respect to an axial direction, which is the direction in which the connection ring 600 is separated from the bracket 500, so as to apply a resistance to the separation of the connection ring 600. Accordingly, it is possible to suppress the connection ring 600 from being inadvertently separated from the bracket 500.

With this configuration, the impeller 130 and the guide vane 150 may be respectively coupled to one side of within the housing 110, and the stator 210 and the rotor 420 may be accommodated in the other side within the housing 110.

The rotation shaft 430 of the rotor 420 may be rotatably supported by a bearing 450 provided inside the guide vane 150.

When the stator 210 and the rotor 420 are accommodated in the housing 110, the bracket 500 may be coupled to the housing 110.

The connection ring 600 may be coupled to the bracket 500 prior to coupling the housing 110 thereto.

When the bracket 500 is coupled to the housing 110, each axial section 650 of the connection ring 600 may be naturally inserted into the corresponding neutral line connection portion 390.

Accordingly, the connection and coupling of the connection ring 600 may be quickly and easily performed.

As each axial section 650 of the connection ring 600 is inserted into the neutral line connection portion 390, the neutral lines 294 of the plurality of phase coils 291 may be electrically connected to one another.

Subsequent to the coupling of the bracket 500, the PCB 490 may be coupled to the bracket 500.

The corresponding PCB connection terminal 385 is inserted into the PCB connection terminal coupling portion 493 for the PCB 490, thereby allowing the plurality of phase coils 291 to be in a state of being applied with three-phase AC power.

When the PCB connection terminal 385 is coupled thereto, the fixing member insertion portion 492 of the PCB 490 and the fixing member coupling portion 120 are in communication with each other, and the fixing member 122 is inserted through the fixing member insertion portion 492 of the PCB 490. The fixing members 122 are screw-coupled to the fixing member coupling portions 120 of the housing 110, respectively. Accordingly, the bracket 500 and the PCB 490 may be integrally and fixedly coupled to the housing 110.

Meanwhile, when an operation is initiated, three-phase AC power is applied to the stator coil 290 through the PCB 490. The rotor 420 is rotated about the rotation shaft 430 by an interaction between a magnetic field formed by the stator coil 290 and a magnetic field formed by the permanent magnet 440.

At this time, the impeller 130 is rotated together with the rotation shaft 430, and air is sucked through an opening (lower opening) at one side of the housing 110. The air sucked into the housing 110 cools the stator 210 and the rotor 420 while passing through the stator 210 and the rotor 420. The air that has passed through the stator 210 and the rotor 420 is discharged to an outside of the housing 110 through the guide vane 150 by way of the impeller 130 and through an upper opening of the housing 110.

Figure 13:
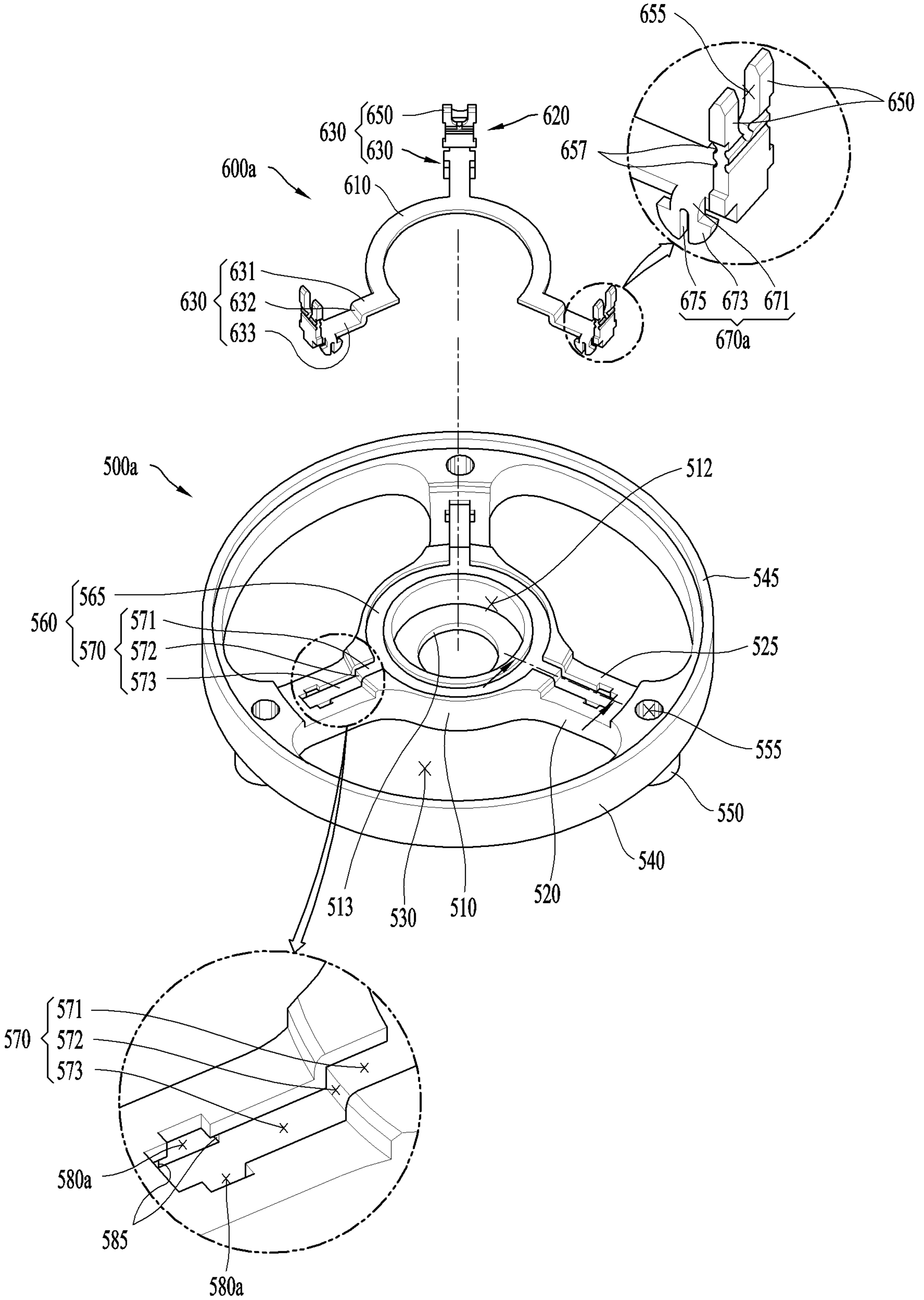
FIG. 13 is a perspective view prior to coupling between a connection ring and a bracket of a motor assembly according to another embodiment of the present disclosure.
Figure 14:
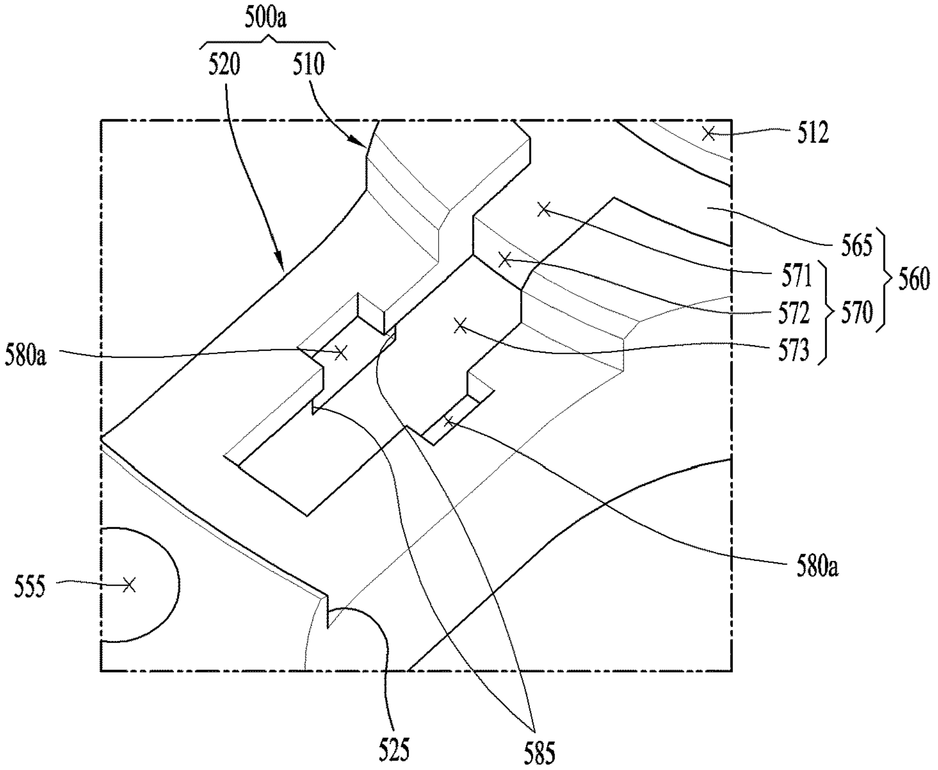
FIG. 14 is an enlarged perspective view of a main portion of the bracket of FIG. 13.
Figure 15:
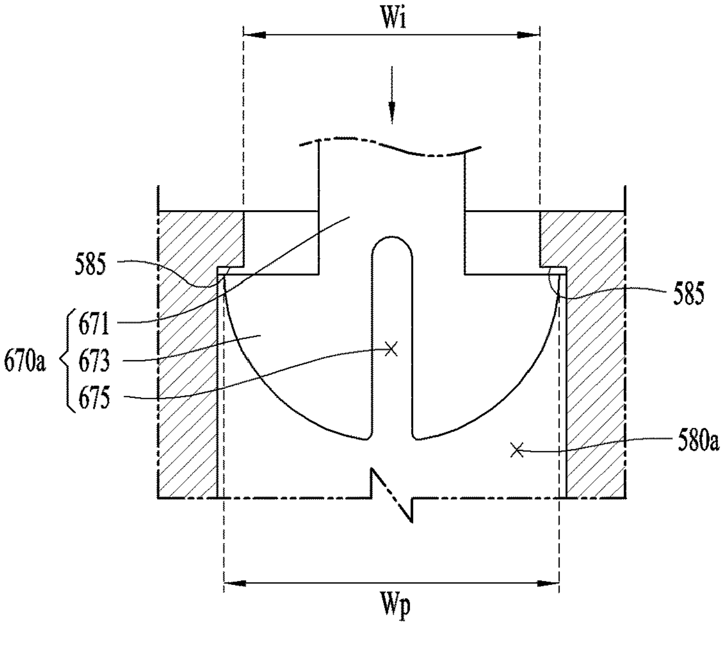
FIG. 15 is a cross-sectional view of a coupling state between the protrusion and the protrusion accommodation portion of FIG. 13.

FIG. 13 is a perspective view prior to coupling between a connection ring and a bracket of a motor assembly according to another embodiment of the present disclosure, FIG. 14 is an enlarged perspective view of a main portion of the bracket of FIG. 13, and FIG. 15 is a cross-sectional view of a coupling state between the protrusion and the protrusion accommodation portion of FIG. 13. As described above, the motor assembly of the present embodiment includes a housing 110, an impeller 130, a stator 210, a rotor 420, and a connection ring 600*a*.

Since the housing 110, the impeller 130, the stator 210, and the rotor 420 of the motor assembly of the present embodiment are the same as those described above with reference to FIGS. 1 to 12, and a detailed description thereof is omitted and replaced with the above-mentioned description.

As shown in FIG. 13, the motor assembly of the present embodiment includes a bracket 500*a* coupled to an end of the housing 110.

The bracket 500*a* includes, for example, a bearing accommodation portion 510, a plurality of spoke portions 520 protruding radially from an outer surface of the bearing accommodation portion 510, and a circular rim portion 540 connecting ends of the plurality of spoke portions 520.

The bracket 500*a* is provided with a plurality of boss portions 550 supporting the PCB 490 at a distance therefrom.

The bracket 500*a* is provided with a fixing member coupling portion 555 such that the fixing member 122 passing through the PCB 490 can be accommodated therein. The fixing member coupling portion 555 is disposed to pass through the plurality of boss portions 550 in an axial direction.

The connection ring 600*a* of the present embodiment is formed of an electrical conductor.

The connection ring 600*a* includes a ring-shaped body 610 with an opening at one side thereof and a plurality of phase coil connection portions 620 protruding in a radial direction from the body 610.

The plurality of phase coil connection portions 620 each include a radial section 630 connected in a radial direction in a protruding manner to the body 610 and an axial section 650 bent from the radial section 630 to be disposed in an axial direction.

The radial section 630 includes a first section 631 connected in a radial direction to the body 610, a bending section 632 bent from the first section 631, and a second section 633 bent from the bending section to be disposed in a radial direction. Here, the bending section 632 is bent to correspond to the recess portion 525 of the spoke portion 520.

Meanwhile, the connection ring 600*a* of the motor assembly of the present embodiment includes a plurality of protrusions 670*a* protruding in an axial direction from the plurality of phase coil connection portions 620.

The bracket 500*a* is provided with a protrusion accommodation portion 580*a* in which the plurality of protrusions 670*a* are respectively accommodated so as to suppress the plurality of protrusions 670*a* from being separated therefrom.

The plurality of protrusions 670*a* may be disposed, for example, on the plurality of phase coil connection portions 620, respectively.

The plurality of protrusions 670*a* may be provided at each of the radial sections 630 of the plurality of phase coil connection portions 620, for example.

The plurality of protrusions 670*a* may be configured to respectively protrude in an axial direction from both side surfaces of the radial sections 630 of the plurality of phase coil connection portions 620, for example.

The plurality of protrusions 670*a* include a protruding section 671 protruding in an axial direction from the plurality of phase coils 291 and an insertion section 673 extending from the protruding section 671 to be inserted into the protrusion accommodation portion 580*a*.

The insertion section 673 is configured to have an extended width compared to that of the protruding section 671, for example.

The insertion section 673 protrudes from an end of the protruding section 671 in both lateral directions along a width direction.

The insertion section 673 includes, for example, a slit 675 cut along a protrusion direction of the protruding section 671 (thickness direction or axial direction of the radial section 630).

Accordingly, the insertion section 673 of the protrusion 670*a* may be elastically deformed in a width direction of the protrusion 670*a*.

The protrusion 670*a* is elastically deformed in a radial direction of the bracket 500*a*.

The bracket 500*a* is provided with a connection ring accommodation portion 560 such that the connection ring 600*a* can be accommodated therein and coupled thereto along an axial direction.

The connection ring accommodation portion 560 may be disposed to be recessed along an axial direction at one end (upper end in the drawing) of the bracket 500*a* along the axial direction, for example.

The connection ring accommodation portion 560 includes, for example, a body accommodation portion 565 accommodating the body 610 and a plurality of phase coil connection accommodation portions 570 accommodating the plurality of phase coil connection portions 620.

The plurality of phase coil connection portion accommodation portions 570 are disposed in the plurality of spoke portions 520 of the bracket 500*a*, respectively.

Meanwhile, the bracket 500*a* is provided with a protrusion accommodation portion 580*a* to accommodate the protrusion 670*a*.

As shown in FIG. 14, the protrusion accommodation portion 580*a* is disposed such that the protrusions 670*a* can be respectively inserted thereinto along an axial direction.

The protrusion accommodation portions 580*a* may be disposed to be recessed or pass therethrough along an axial direction at both sides of the phase coil connection portion accommodation portion 570, for example.

Each of the protrusion accommodation portion 580*a* is disposed to communicate with the phase coil connection portion accommodation portion 570.

The protrusion accommodation portion 580*a* includes, for example, an engagement portion 585 having a reduced width (inner width) Wi compared to a maximum width (outer width) Wp of the protrusion 670*a*.

The engagement portion 585 is disposed at an entrance of the protrusion accommodation portion 580*a*.

Accordingly, when each of the protrusions 670*a* is inserted into the protrusion accommodation portion 580*a*, it is pressed by the engagement portion 585 to allow the insertion section 673 to be elastically deformed in a direction in which the slit 675 is reduced. When the insertion section 673 in a reduced state passes through the engagement portion 585, the insertion section 673 is restored to an initial position (the slit 675 becomes its initial size) by its own elastic force.

When the insertion section 673 of the protrusion 670*a* is restored to its initial position, as shown in FIG. 15, an upper end of the insertion section 673 may come into contact with a lower end of the engagement portion 585, thereby suppressing the protrusion 670*a* from being inadvertently separated from the protrusion accommodating portion 580*a*.

Figure 16:
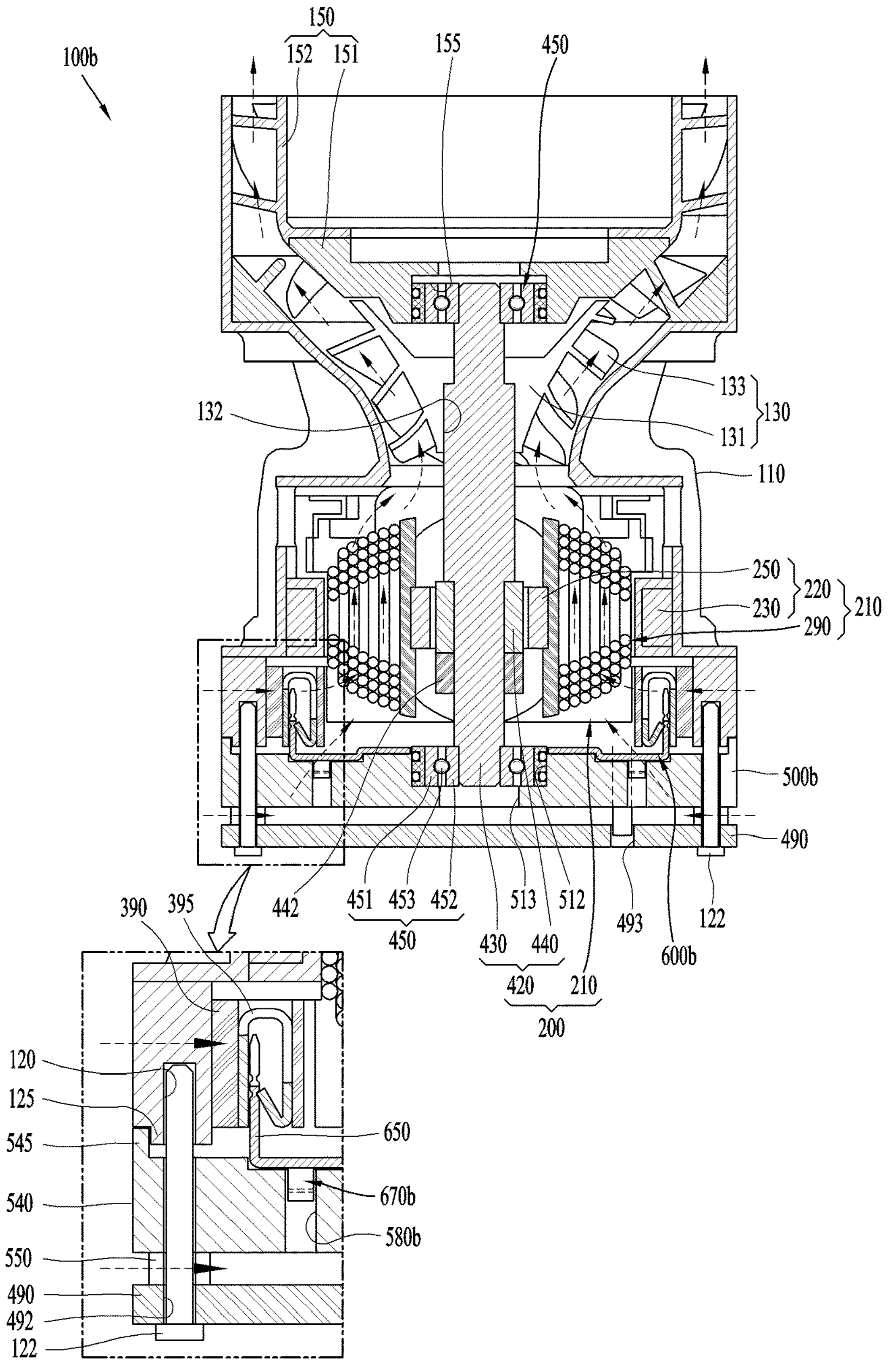
FIG. 16 is a cross-sectional view of a motor assembly according to still another embodiment of the present disclosure.
Figure 17:
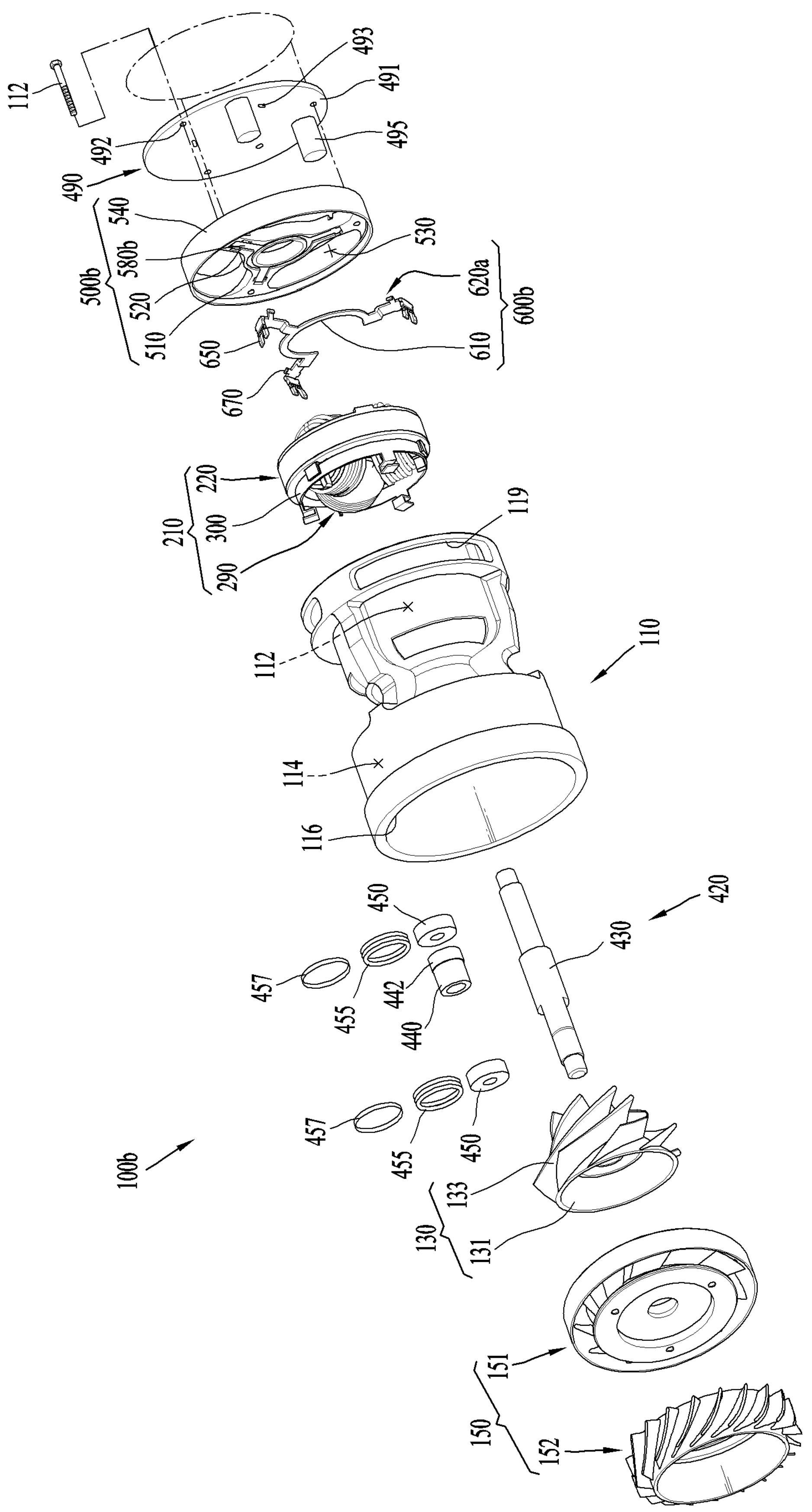
FIG. 17 is an exploded perspective view of the motor assembly of FIG. 16.

FIG. 16 is a cross-sectional view of a motor assembly according to still another embodiment of the present disclosure, and FIG. 17 is an exploded perspective view of the motor assembly of FIG. 16. The motor assembly 100*b* of the present embodiment includes a housing 110, an impeller 130, a stator 210, a rotor 420 and a connection ring 600*b*.

The housing 110 has, for example, a cylindrical shape with openings at both sides thereof.

The impeller 130 is rotatably accommodated in one side within the housing 110.

The impeller 130 includes, for example, a hub 131 and a plurality of blades 133 disposed around the hub 131.

One side of the impeller 130 is provided with a guide vane 150 to guide the movement of air. The guide vane 150 includes, for example, a first guide vane 151 and a second guide vane 152 coupled to each other along an axial direction.

A stator 210 is provided inside the housing 110.

The stator 210 includes, for example, a stator core 220, a stator coil 290 wound around the stator core 220, and an insulator 300 for insulating the stator core 220 and the stator coil 290.

The stator coil 290 is configured to be applied with three-phase AC power.

The stator coil 290 includes, for example, plurality of phase coils 291 connected to respective phases (U-phase, V-phase, W-phase) of the three-phase AC power source.

The rotor 420 includes, for example, a rotation shaft 430 and a permanent magnet 440 rotated around the rotation shaft 430.

An end ring 442 coupled to the rotation shaft 430 to support the permanent magnet 440 is provided at one side of the permanent magnet 440.

Both sides of the rotation shaft 430 are rotatably supported by bearings 450, respectively.

Each of the bearings 450 includes, for example, an outer ring 451, an inner ring 452 concentrically disposed inside the outer ring 451, and a plurality of balls 453 provided between the outer ring 451 and the inner ring 452.

Each of the bearings 450 is coupled to an inside of the bearing holder 455, respectively.

A sealing member 457 is provided on an outer surface of each of the bearing holders 455, respectively.

The rotation shaft 430 has a length that can be coupled to the impeller 130.

The bearing 450 supporting one side (upper side in the drawing) of the rotation shaft 430 is provided on the guide vane 150.

The bearing 450 supporting the other side (lower side in the drawing) of the rotation shaft 430 is provided at a lower side of the housing 110.

A bracket 500*b* is coupled to a lower end of the housing 110.

The bracket 500*b* may include, for example, a bearing accommodation portion 510 in which the bearing 450 is accommodated, a plurality of spoke portions 520 protruding along a radial direction from the bearing accommodation portion 510, and a rim portion 540 connecting the ends of the plurality of spoke portions 520.

The bearing 450 supporting the lower end of the rotation shaft 430 is supported by the bracket 500*b*.

A PCB 490 is coupled to one side (lower side in the drawing) of the bracket 500*b*.

The PCB 490 includes, for example, a substrate 491 and a plurality of circuit components 495 provided on the substrate 491.

The PCB 490 is coupled to the bracket 500*b* by, for example, a plurality of fixing members 122. The PCB 490 comes into contact with a plurality of boss portions 550 protruding in an axial direction, thereby allowing the bracket 500*b* and the PCB 490 to be separated by a preset distance in an axial direction.

Meanwhile, a connection ring 600*b* electrically connecting one ends (neutral lines 294) of the plurality of phase coils 291 of the stator coil 290 at the same time is provided between the stator 210 and the bracket 500*b*.

The connection ring 600*b* may be configured to be accommodated in and coupled to the bracket 500*b*, for example.

Figure 18:
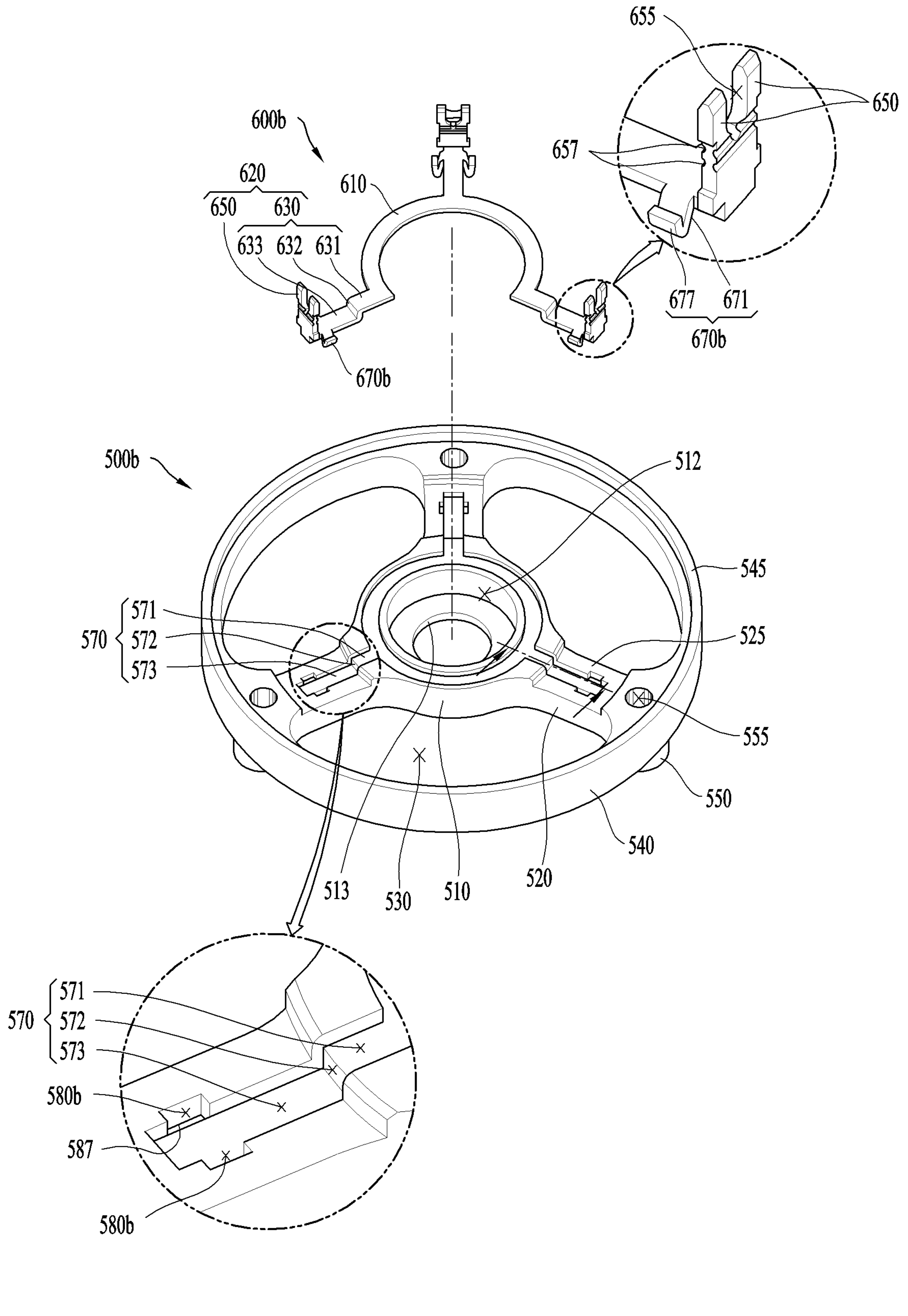
FIG. 18 is a perspective view prior to coupling between a connection ring and a bracket in FIG. 17.

FIG. 18 is a perspective view prior to coupling between a connection ring and a bracket in FIG. 17. As shown in FIG. 18, the connection ring 600*b* is formed of an electrical conductor.

The connection ring 600*b* includes a ring-shaped body 610 with an opening at one side thereof and a plurality of phase coil connection portions 620 each extending in a radial direction from the body 610 to be connected to ends of the plurality of phase coils 291, respectively.

The bracket 500*b* includes, for example, a bearing accommodation portion 510, a plurality of spoke portions 520 disposed radially around the bearing accommodation portion 510, and a rim portion 540 connecting the ends of the plurality of spoke portions 520. The plurality of spoke portions 520 are provided with the recess portions 525 to be recessed along an axial direction.

The plurality of phase coil connection portions 620 may include, for example, a radial section 630 extending in a radial direction from the body 610 and an axial section 650 bent from the radial section 630 to be disposed in an axial direction. The axial section 650 may be electrically connected to each of the plurality of phase coils 291.

Accordingly, one end (neutral line 294) of each of the plurality of phase coils 291 of the stator coil 290 may be connected to the plurality of phase coil connection portions 620, thereby allowing to be electrically connected to each other at the same time.

The radial section 630 of the plurality of phase coil connection portions 620 includes, for example, a first section 631 protruding in a radial direction from the body 610, a bending section 632 bent from the first section 631, and a second section 633 bent from the bending section to be disposed in a radial direction.

The connection ring 600*b* is configured to be accommodated in and coupled to the bracket 500*b* along an axial direction.

The bracket 500*b* is provided with a connection ring accommodation portion 560 to accommodate the connection ring 600*b*.

The connection ring accommodation portion 560 is disposed to be recessed along an axial direction at one end (upper end in the drawing) of the bracket 500*b* along the axial direction, for example.

The connection ring accommodation portion 560 includes, for example, a body accommodation portion 565 accommodating the body 610 and a plurality of phase coil connection accommodation portions 570 accommodating the plurality of phase coil connection portions 620. The plurality of phase coil connection portion accommodation portions 570 include, for example, a first section 571, a bending section 572, and a second section 573 corresponding to the shape of the phase coil connection portion 620.

Meanwhile, the connection ring **600*b* is provided with a protrusion 670*b*, and the bracket 500*b* is provided with a protrusion accommodation portion 580*b* in which the protrusion 670*b* is accommodated so as to suppress the protrusion 670*b*** from being separated therefrom.

The protrusion **670*b* is provided on each of the plurality of phase coil connection portions 620**, for example.

The protrusion **670*b* is disposed to protrude in an axial direction from both side surfaces of the plurality of phase coil connection portions 620**.

The protrusion **670*b* includes, for example, an elastic deformation portion 677** capable of elastic deformation.

The protrusion **670*b* includes, for example, a protruding section 671 protruding in an axial direction from the radial section 630 and the elastic deformation portion 677 bent from an end of the protruding section 671**.

More specifically, as shown in FIG. 18, the protruding section 671 of the protrusion **670*b* protrudes from both side surfaces of the plurality of phase coil connection portions 620** to one side (lower side in the drawing) along an axial direction.

The elastic deformation portion 677 is bent at an end of the protruding section 671 to protrude so as to be inclined upward outwardly along a width direction.

Accordingly, the ends of the elastic deformation portion 677 are spaced apart from both sides of the radial section 630 by a preset distance.

The protrusion accommodation portion **580*b* is disposed at a position corresponding to the protrusion 670*b* such that the protrusion 670*b* can be inserted thereinto when the connection ring 600*b*** is coupled thereto.

Each of the protrusion accommodation portions **580*b* may be disposed at both sides of the phase coil connection portion accommodation portion 570, respectively, to communicate with the phase coil connection portion accommodation portion 570**.

Figure 19:
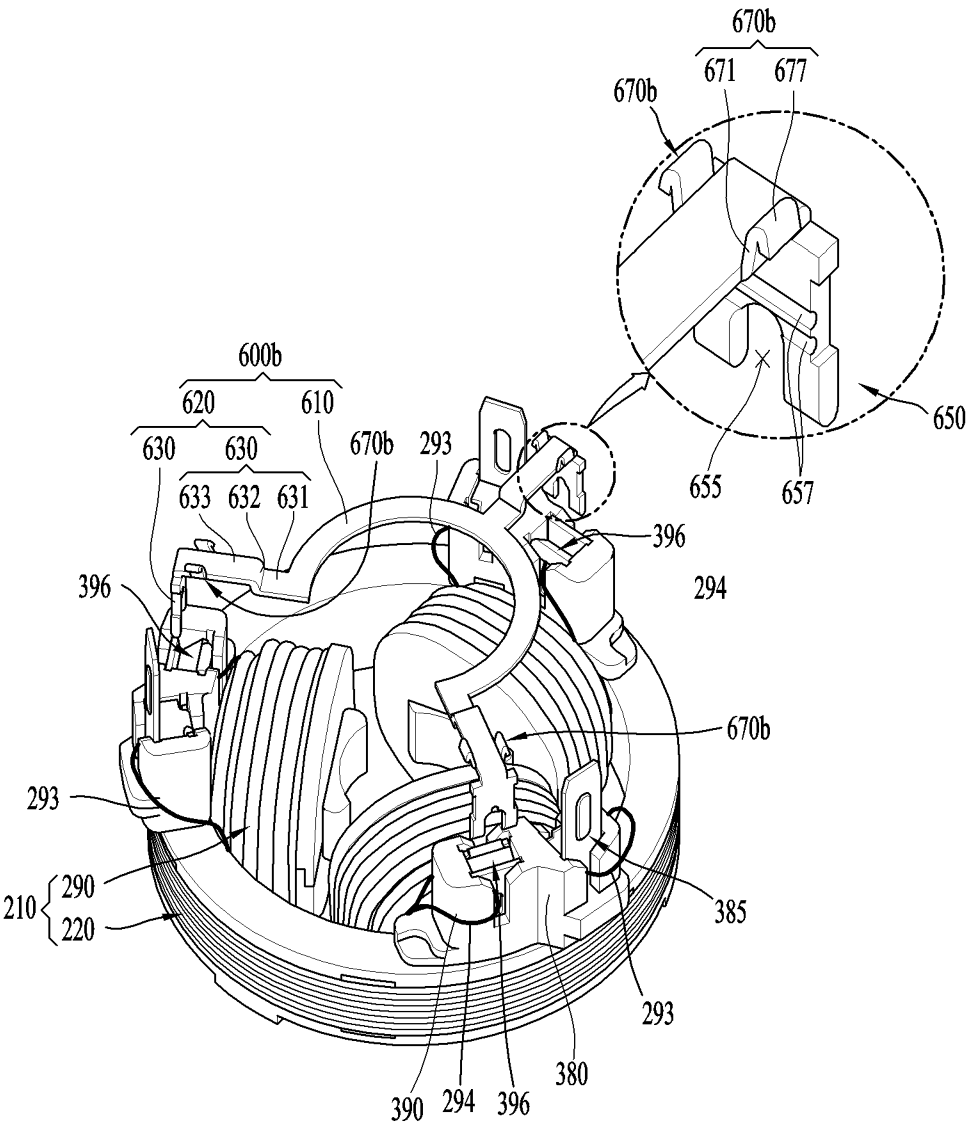
FIG. 19 is a view for explaining coupling between a connection ring and a stator in FIG. 17.

FIG. 19 is a view for explaining coupling between a connection ring and a stator in FIG. 17. As shown in FIG. 19, the stator 210 includes a stator core 220, a stator coil 290 wound around the stator core 220, and an insulator 300 for insulating the stator core 220 and the stator coil 290. The stator coil 290 includes a plurality of phase coils 291.

The insulator 300 is provided with a plurality of power line connection portions 380 to which one ends (power lines 293) of the plurality of phase coils 291 are connected. Each of the power line connection portions 380 is provided with a PCB connection terminal 385 having one side connected to the power line 293 and the other side connected to the PCB 490.

The insulator 300 is provided with a neutral line connection portion 390 to which the other end (neutral line 294) of each of the plurality of phase coils 291 is connected. The neutral line connection portion 390 is provided with a neutral line connection conductor 395 having one side connected to the neutral line 294 and the other side connected to the connection ring **600*b***.

The connection ring **600*b* includes a ring-shaped body 610 with an opening at one side thereof and a plurality of phase coil connection portions 620 protruding along a radial direction from the body 610**.

The plurality of phase coil connection portions 620 include, for example, a radial section 630 protruding in a radial direction from the body 610 and a plurality of axial sections 650 bent from the radial section 630 to be disposed in an axial direction and connected to the plurality of phase coils 291, respectively.

Each of the plurality of phase coil connection portions 620 is provided with a cutout portion 655 cut in an axial direction.

Each radial section 630 of the connection ring **600*b* is provided with a protrusion 670*b* disposed along an axial direction opposite to the axial section 650**.

Figure 20:
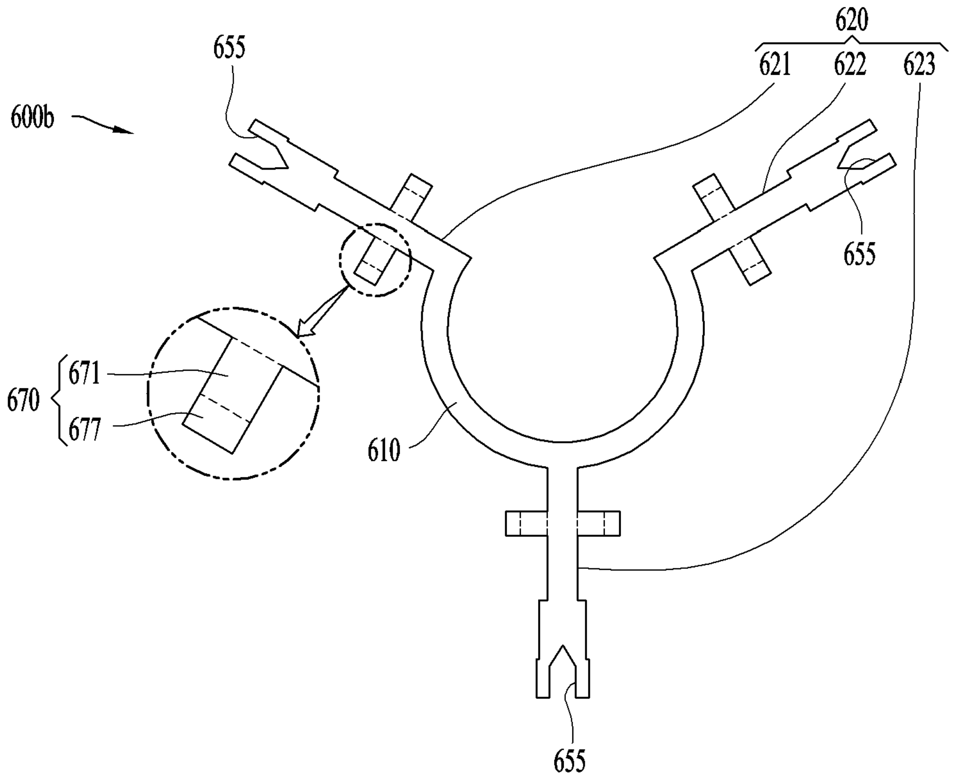
FIG. 20 is an exploded view of the connection ring of FIG. 17.

FIG. 20 is an exploded view of the connection ring of FIG. 17. As shown in FIG. 20, the connection ring **600*b* of the motor assembly 100*b* of the present embodiment may be manufactured by stamping a plate-shaped base material 700 made of copper with a mold 710**, as described above.

The connection ring **600*b* includes a ring-shaped body 610 with an opening at one side thereof, a plurality of phase coil connection portions 620 protruding in a radial direction from the body 610, and protrusions 670*b* provided on the plurality of phase coil connection portions 620**.

The protrusions **670*b* protruding outwardly are respectively provided on both side surfaces of the plurality of phase coil connection portions 620**.

As described above, for the connection ring **600*b* of the present embodiment, molds 710 may be aligned in such a manner that the phase coil connection portion 620 of another connection ring 600*b* is disposed at an inner side of the body 610 having an opening at one side thereof with a minimum distance so as to simultaneously produce a plurality of connection rings 600*b*, thereby significantly improving a number of connection rings 600*b* produced per unit area (A) of the base material 700**.

As a result, the generation of scrap of the base material 700 may be significantly reduced to improve the production yield of the connection ring **600*b***.

Figure 21:
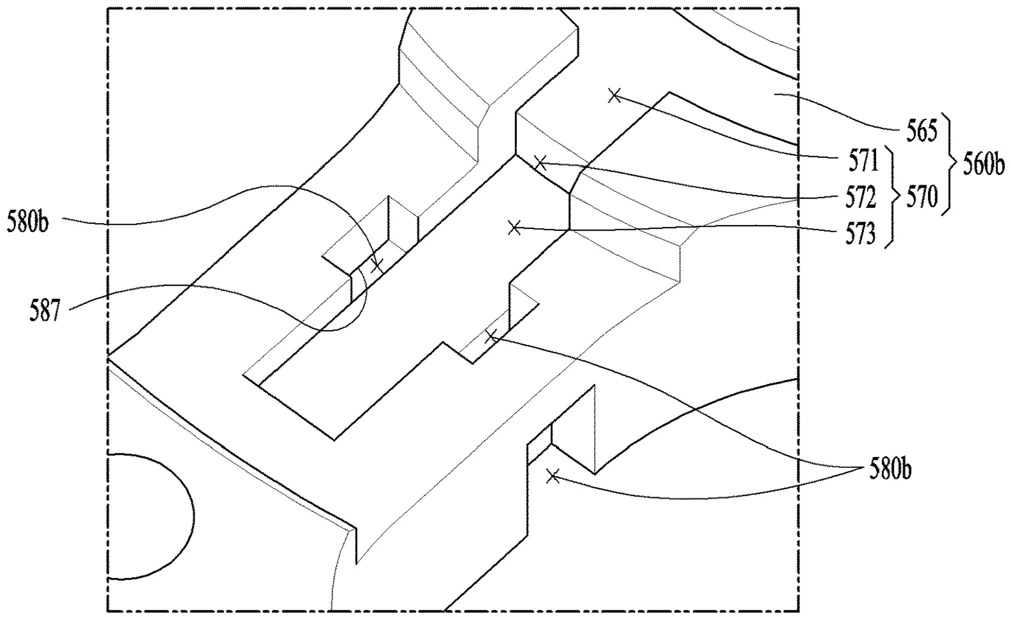
FIG. 21 is an enlarged perspective view of a main portion of the bracket of FIG. 18.
Figure 22:
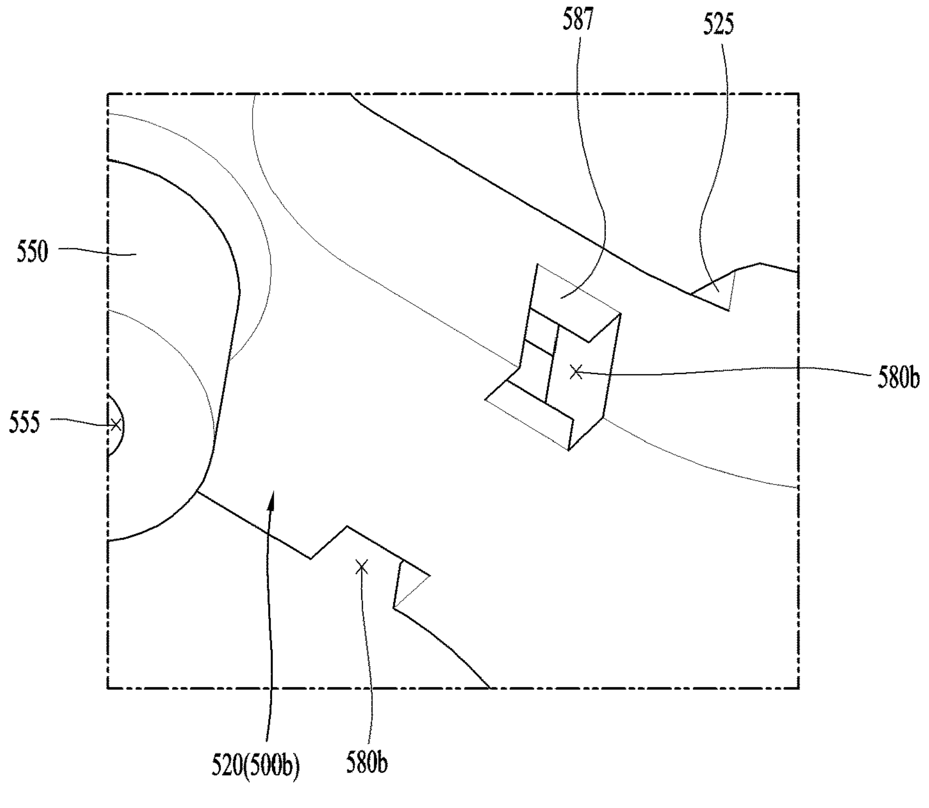
FIG. 22 is a bottom perspective view of a protrusion accommodation portion in FIG. 21.
Figure 23:
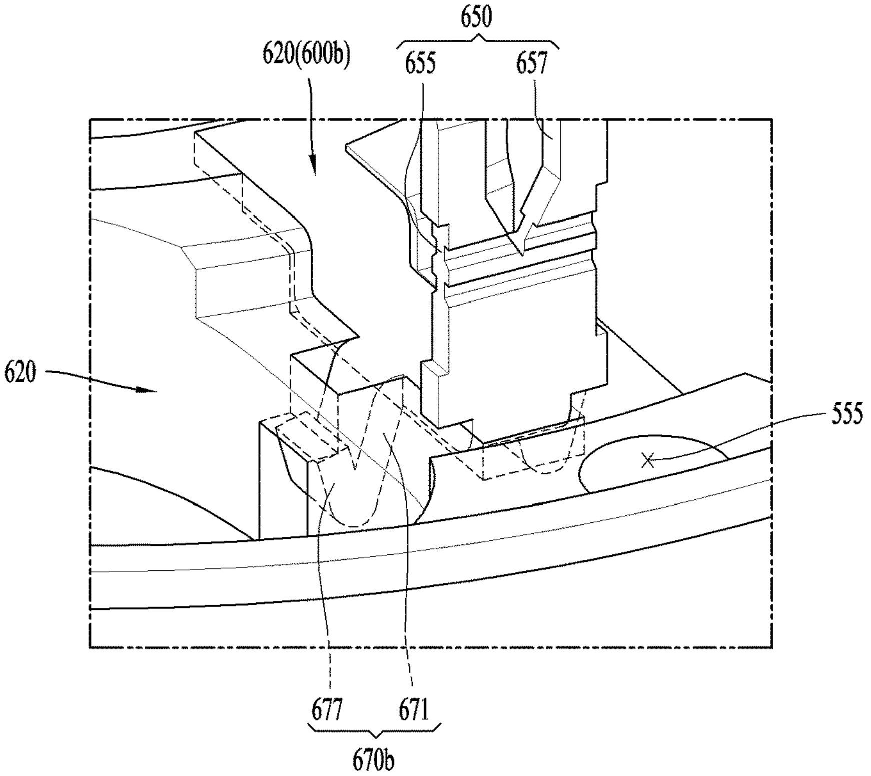
FIG. 23 is a perspective view of a coupling state between a protrusion and a protrusion accommodation portion in FIG. 18.
Figure 24:
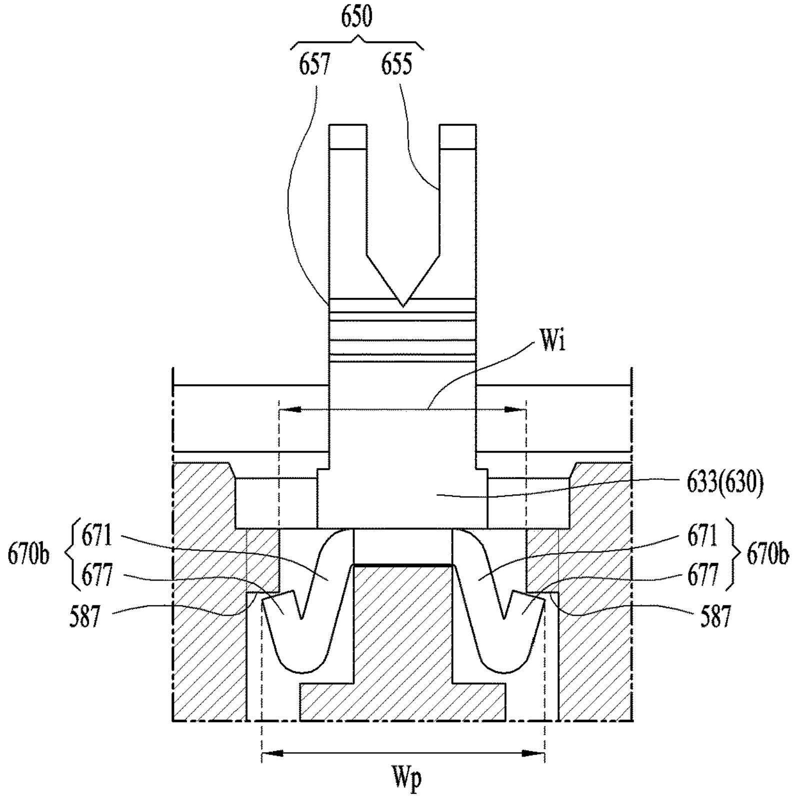
FIG. 24 is a cross-sectional view of a coupling state between the protrusion and the protrusion accommodation portion of FIG. 23.

FIG. 21 is an enlarged perspective view of a main portion of the bracket of FIG. 18, FIG. 22 is a bottom perspective view of a protrusion accommodation portion in FIG. 21, FIG. 23 is a perspective view of a coupling state between a protrusion and a protrusion accommodation portion in FIG. 18, and FIG. 24 is a cross-sectional view of a coupling state between the protrusion and the protrusion accommodation portion of FIG. 23. As shown in FIG. 21, the connection ring accommodation portion 560 includes a body accommodation portion 565 in which the body 610 is accommodated, and a plurality of phase coil connection portions 570 in which the plurality of phase coil connection portions 620 are accommodated.

The bracket **500*b* is provided with a protrusion accommodation portion 580*b* accommodating the protrusion 670*b* to prevent the protrusion 670*b*** from being separated therefrom.

The protrusion accommodation portions **580*b* are disposed, for example, at both sides of each of the phase coil accommodation portion 570**, respectively.

Each of the protrusion accommodation portion **580*b* is disposed to communicate with the phase coil connection portion accommodation portion 570**, for example.

Each of the protrusion accommodation portions **580*b* may be disposed to pass through the spoke portion 520 along an axial direction, as shown in FIG. 22**, for example.

The protrusion accommodation portion **580*b* may each include an engagement portion 587 having a reduced width (inner width) Wi compared to a width (outer width) Wp of the protrusion 670*b***.

The engagement portion 587 is disposed, for example, at an entrance side of the protrusion accommodation portion **580*b***.

An empty space may be formed on one side (lower side in the drawing) of the engagement portion 587.

A width (inner width) between the engagement portions 587 may be disposed to be greater than that between boundaries at the protruding section 671 and the elastic deformation portion 677 of the protrusion 670*b*.

Accordingly, when the protrusion 670*b* and the protrusion accommodation portion 580*b* are coupled to each other, the protruding section 671 of the protrusion 670*b* and a lower region of the elastic deformation portion 677 may be easily inserted into an inside of the engagement portion 587, thereby facilitating coupling between the protrusion 670*b* and the protrusion accommodation portion 580*b*.

With this configuration, when desired to couple the connection ring 600*b* to the bracket 500*b*, as shown in FIG. 18, the connection ring 600*b* is disposed above the bracket 500*b*. The plurality of phase coil connection portions 620 of the connection ring 600*b* are arranged to correspond to the plurality of phase coil connection portion accommodation portions 570 of the bracket 500*b*.

At this time, each of the protrusions 670*b* is disposed between the engagement portions 587 to correspond to the corresponding protrusion accommodation portion 580*b*.

Here, an inner width between boundary regions at the protruding section 671 and the elastic deformation portion 677 of each of the protrusions 670*b* may be disposed to be smaller than an inner width of the engagement portion 587 of the protrusion accommodation portion 580*b*, thereby allowing each of the protrusions 670*b* to be easily inserted into the protrusion accommodation portion 580*b*.

The elastic deformation portion 677 of the protrusion 670*b* is disposed to be inclined with respect to an axial direction and the maximum width Wp of the protrusion 670*b* is greater than the inner width Wi between the engagement portions 587, and thus the elastic deformation portion 677 comes into contact with the engagement portion 587 to be inserted into the protrusion accommodation portion 580*b* while being elastically deformed by a pressing force acting in an axial direction.

When the protrusion 670*b* passes the engagement portion 587, it returns to its initial position by its own elastic force. When the protrusion 670*b* returns to its initial position, an end of the protrusion 670*b* (elastic deformation portion 677) comes into contact with the engagement portion 587 as shown in FIGS. 23 and 24 since the width (outer width) Wp between the protrusions 670*b* is greater than the inner width Wi. Accordingly, the protrusion 670*b* may be suppressed from being inadvertently separated from the protrusion accommodation portion 580*b*.

The foregoing description has been given of specific implementations of the present disclosure. However, since the present disclosure can be embodied in various forms without departing from the essential characteristics, the implementations described above should not be limited by the specific contents for carrying out the invention.

In addition, even implementations not listed in the foregoing detailed description should be broadly construed within the scope of the technical idea defined in the appended claims. Moreover, all changes and modifications included within the technical range of the claims and their equivalents should be embraced by the appended claims.

The invention claimed is:

1. A motor assembly comprising:

a housing;

an impeller provided inside the housing;

a stator provided inside the housing and provided with a plurality of phase coils;

a rotor provided with a rotation shaft connected to the impeller and rotatably disposed with respect to the stator;

a connection ring comprising an electrical conductor and connected to one ends of the plurality of phase coils; and a bracket coupled to the housing and supporting the rotation shaft, wherein the connection ring comprises:

a ring-shaped body with an opening at one side thereof, and a plurality of phase coil connection portions each extending in a radial direction from the body to be connected to ends of the plurality of phase coils, respectively, wherein the connection ring is provided with a pair of protrusions on respective circumferential sides thereof in an axial direction, respectively, wherein the bracket is provided with a pair of protrusion accommodation portions at respective circumferential sides thereof, such that the pair of protrusions are inserted and blocked from being separated from the bracket, wherein the pair of protrusion accommodation portions are each inclined with respect to an axial direction, to be spaced apart from each other toward the circumferential sides of the bracket, and wherein the protrusions are retained within the pair of protrusion accommodation portions, respectively, while being elastically deflected to be inclined with respect to the axial direction along the pair of protrusion accommodation portions.

2. The motor assembly of claim 1, wherein the bracket is provided with a connection ring accommodation portion in which the connection ring is accommodated therein and coupled thereto in an axial direction.

3. The motor assembly of claim 1, wherein each of the plurality of phase coil connection portions comprises (i) a radial section connected in a radial direction to the body and (ii) an axial section extending in an axial direction from the radial section, and wherein the protrusions are respectively disposed to protrude in an axial direction from the radial section.

4. The motor assembly of claim 1, wherein each protrusion is provided with a slit configured to allow elastic flexibility, and the protrusion accommodation portion is provided with an engagement portion having a reduced width relative to a width of the protrusion.

5. The motor assembly of claim 1, wherein each protrusion is provided with an elastic deformation portion, and the protrusion accommodation portion is provided with an engagement portion having a reduced width relative to a width of the elastic deformation portion prior to being elastically deflected.

6. The motor assembly of claim 3, wherein the stator is provided with a neutral line connection portion into which the axial section is inserted, and the neutral line connection portion is provided with a neutral line connection conductor to which one end of each of the plurality of phase coils and the neutral line connection portion are connected.

7. The motor assembly of claim 6, wherein the axial section is provided with an engagement portion with which one region of the neutral line connection conductor is engaged.

8. The motor assembly of claim 1, wherein the stator includes a stator core and a stator coil including the plurality of phase coils wound around the stator core, wherein the stator core includes (i) a ring-shaped yoke and (ii) a plurality of teeth coupled to be disposed in a radial direction on an inner surface of the yoke, and wherein the plurality of phase coils are wound around the plurality of teeth, respectively.

9. The motor assembly of claim 1, wherein the plurality of phase coil connection portions comprise:

a first-phase coil connection portion extending in a radial direction from one end of the body;

a second-phase coil connection portion extending in a radial direction from the other end of the body; and a third-phase coil connection portion extending in a radial direction between the first-phase coil connection portion and the second-phase coil connection portion along a circumferential direction of the body.

10. The motor assembly of claim 1, wherein the plurality of phase coil connection portions are each provided with a cutout portion to allow one end of each of the plurality of phase coils to be inserted thereinto.

* * * * *